US012791830B2

(12) United States Patent
Yu et al.

(10) Patent No.: US 12,791,830 B2
(45) Date of Patent: Nov. 10, 2026

(54) CAMERA OPTICAL LENS

(71) Applicant: AAC Optics (Suzhou) Co., Ltd., Suzhou (CN)

(72) Inventors: Renlong Yu, Suzhou (CN); Shunda Zhou, Suzhou (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 294 days.

(21) Appl. No.: 18/399,637

(22) Filed: Dec. 28, 2023

(65) Prior Publication Data

US 2025/0044550 A1 Feb. 6, 2025

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01)

(58) Field of Classification Search
CPC ...... G02B 9/60; G02B 13/0045; G02B 13/00; G02B 13/006; G02B 13/06; G02B 13/18; G03B 30/00
USPC .......................................................... 359/714
See application file for complete search history.

(56) References Cited

U.S. PATENT DOCUMENTS

| | | | | |
|---|---|---|---|---|
| 6,404,945 B1 * | 6/2002 | Wade | G02B 6/2931 | 385/24 |
| 11,719,960 B1 * | 8/2023 | Herbert | G02B 3/14 | 359/665 |
| 2017/0010446 A1 * | 1/2017 | Liu | G02B 13/06 | |
| 2019/0258028 A1 * | 8/2019 | Huang | H04N 23/55 | |

* cited by examiner

*Primary Examiner* — Stephone B Allen
*Assistant Examiner* — Boutsikaris Leonidas
(74) *Attorney, Agent, or Firm* — Wiersch Law Group

(57) ABSTRACT

Provided is a camera optical lens which includes from an object side to an image side: first lens having negative refractive power, second lens having negative refractive power, third lens having positive refractive power, fourth lens having negative refractive power, and fifth lens having positive refractive power. The first lens is made of glass material. A refractive index of the first lens is n1, a central curvature radius of an object-side surface of the second lens is R3, a central curvature radius of an image-side surface of the second lens is R4, a focal length of the third lens is f3, a focal length of the camera optical lens is f, and following relations are satisfied: $1.70 \leq n1 \leq 2.10$; $3.20 \leq (R3+R4)/(R3-R4) \leq 4.70$; and $3.00 \leq f3/f \leq 5.00$. The camera optical lens has excellent optical characteristics and characteristics of large aperture, ultra-thin, and ultra-wide-angle.

9 Claims, 14 Drawing Sheets

CAMERA OPTICAL LENS

TECHNICAL FIELD

The present disclosure relates to the field of optical lens and, in particular, to a camera optical lens suitable for handheld terminal devices such as smart phone and digital camera, and camera devices such as monitor, PC lens, vehicle-mounted lens and unmanned aerial vehicle.

BACKGROUND

In recent years, with the rise of various smart devices, there is increasing demand for miniaturized camera optical lens. Due to the reduction in pixel size of photosensitive device the and the development trend of the current electronic product with excellent function, lightweight and portable, the miniaturized camera optical lens with good imaging quality has become the mainstream on the current market. In order to achieve better imaging quality, a multi-lens structure is adopted. In addition, with the development of technology and the increasing diverse needs of users, as the pixel area of photosensitive device continues to reduce and the requirements on imaging quality continue to increase, a five-lens structure is gradually appeared in lens design. A wide-angle camera lens with excellent optical characteristics, a small volume, and sufficiently corrected aberrations is urgently desired.

SUMMARY

In view of the above problems, the present disclosure aims to provide a camera optical lens which not only has good optical performance, but also meets the design requirements of large aperture, ultra-thin, and ultra-wide-angle.

In order to solve the above technical problems, an embodiment of the present disclosure provides a camera optical lens, comprising, from an object side to an image side: a first lens having negative refractive power, a second lens having negative refractive power, a third lens having positive refractive power, a fourth lens having negative refractive power, and a fifth lens having positive refractive power. The first lens is made of glass material. A refractive index of the first lens is n1, a central curvature radius of an object-side surface of the second lens is R3, a central curvature radius of an image-side surface of the second lens is R4, a focal length of the third lens is f3, a focal length of the camera optical lens is f, and the following relations are satisfied: $1.70 \leq n1 \leq 2.10$; $3.20 \leq (R3+R4)/(R3-R4) \leq 4.70$; $3.00 \leq f3/f \leq 5.00$.

As an improvement, an on-axis thickness of the fourth lens is d7, an on-axis thickness of the fifth lens is d9, an on-axis distance from an image-side surface of the third lens to an object-side surface of the fourth lens is d6, and the following relation is satisfied: $1.00 \leq (d7+d9)/d6 \leq 2.50$.

As an improvement, a combined focal length of the fourth lens and the fifth lens is f45, and the following relation is satisfied: $2.10 \leq f45/f \leq 4.00$.

As an improvement, a total track length of the camera optical lens is TTL, and the following relation is satisfied: $8.00 \leq TTL/f \leq 12.00$.

As an improvement, an object-side surface of the first lens is convex at a paraxial position, and an image-side surface of the first lens is concave at the paraxial position. A focal length of the first lens is f1, a central curvature radius of the object-side surface of the first lens is R1, a central curvature radius of the image-side surface of the first lens is R2, an on-axis thickness of the first lens is d1, a total track length of the camera optical lens is TTL, and the following relations are satisfied: $-7.82 \leq f1/f \leq -2.30$; $0.81 \leq (R1+R2)/(R1-R2) \leq 2.63$; $0.00 \leq d1/TTL \leq 0.15$.

As an improvement, the object-side surface of the second lens is convex at a paraxial position, and the image-side surface of the second lens is concave at the paraxial position. A focal length of the second lens is f2, an on-axis thickness of the second lens is d3, a total track length of the camera optical lens is TTL, and the following relations are satisfied: $-20.66 \leq f2/f \leq -2.89$; $0.02 \leq d3/TTL \leq 0.13$.

As an improvement, an object-side surface of the third lens is concave at a paraxial position, and an image-side surface of the third lens is convex at the paraxial position. A central curvature radius of the object-side surface of the third lens is R5, a central curvature radius of the image-side surface of the third lens is R6, an on-axis thickness of the third lens is d5, a total track length of the camera optical lens is TTL, and the following relations are satisfied: $0.83 \leq (R5+R6)/(R5-R6) \leq 2.98$; $0.04 \leq d5/TTL \leq 0.18$.

As an improvement, an object-side surface of the fourth lens is convex at a paraxial position, and an image-side surface of the fourth lens is concave at the paraxial position. A focal length of the fourth lens is f4, a central curvature radius of the object-side surface of the fourth lens is R7, a central curvature radius of the image-side surface of the fourth lens is R8, an on-axis thickness of the fourth lens is d7, a total track length of the camera optical lens is TTL, and the following relations are satisfied: $-9.83 \leq f4/f \leq -1.83$; $1.00 \leq (R7+R8)/(R7-R8) \leq 3.74$; $0.02 \leq d7/TTL \leq 0.10$.

As an improvement, an object-side surface of the fifth lens is convex at a paraxial position, and an image-side surface of the fifth lens is convex at the paraxial position. A focal length of the fifth lens is f5, a central curvature radius of the object-side surface of the fifth lens is R9, a central curvature radius of the image-side surface of the fifth lens is R10, an on-axis thickness of the fifth lens is d9, a total track length of the camera optical lens is TTL, and the following relations are satisfied: $0.66 \leq f5/f \leq 3.20$; $-0.40 \leq (R9+R10)/(R9-R10) \leq -0.02$; $0.06 \leq d9/TTL \leq 0.22$.

As an improvement, a field of view in a diagonal direction of the camera optical lens is FOV, and the following relation is satisfied: $FOV \geq 194°$.

The present disclosure has the following beneficial effects: the camera optical lens according to the present disclosure has excellent optical characteristics and characteristics of large aperture, ultra-thin, and ultra-wide-angle, and is particularly suitable for camera lens assembly, composed of high pixel CCD, CMOS and other camera elements, of mobile phone, WEB camera lens, and camera lens for unmanned aerial vehicle.

BRIEF DESCRIPTION OF DRAWINGS

In order to describe the technical solutions in the embodiments of the present disclosure more clearly, the drawings which are needed in the description of the embodiments will be briefly introduced as follows. It is appreciated that, the drawings in the following description are only some of the embodiments of the present disclosure, and for those of ordinarily skilled in the art, other drawings can also be obtained in accordance with these drawings without any creative effort.

DESCRIPTION OF EMBODIMENTS

To make the objects, technical solutions and advantages of the present disclosure more clear and complete, embodiments of the present disclosure will be described in detail in conjunction with the drawings hereinafter. However, those of ordinary skill in the art will appreciate that in various embodiments of the present disclosure, the technical details are set forth for the reader to better understand the present disclosure. However, even without these technical details and various variations and modifications based on the following embodiments, the technical solutions claimed in the present disclosure can be implemented.

First Embodiment

Figure 1:
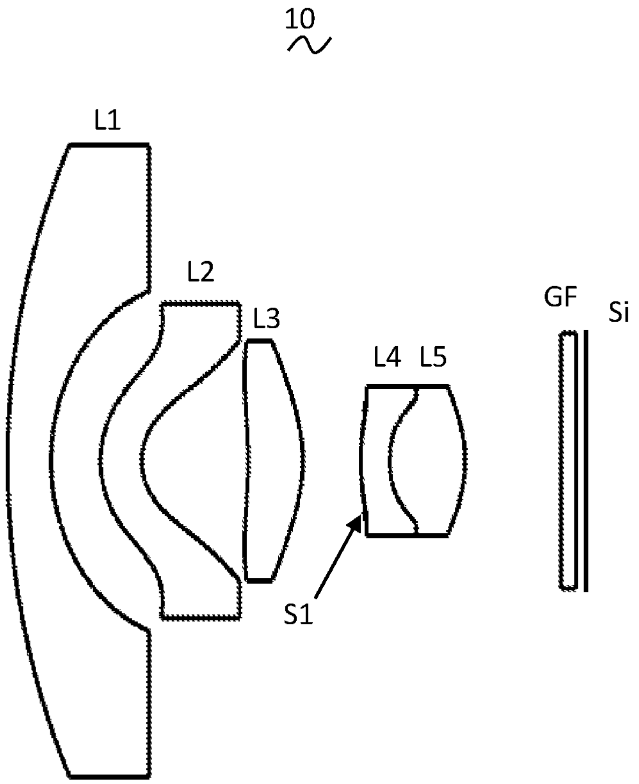
FIG. 1 is a structural schematic diagram of a camera optical lens according to a first embodiment of the present disclosure.

Referring to the drawings, the present disclosure provides a camera optical lens 10. FIG. 1 shows a camera optical lens 10 according to the first embodiment of the present disclosure, and the camera optical lens 10 includes five lenses. The camera optical lens 10 includes, from an object side to an image side: a first lens L1, a second lens L2, a third lens L3, an aperture S1, a fourth lens L4, and a fifth lens L5. An optical element such as grating filter GF may be provided between the fifth lens L5 and an image plane Si.

In this embodiment, the first lens L1 is made of glass material, the second lens L2 is made of plastic material, the third lens L3 is made of plastic material, the fourth lens L4 is made of plastic material, and the fifth lens L5 is made of plastic material. The appropriate selection of glass lenses can improve the optical performance of the camera optical lens 10, while making the system work stably under extremely cold and hot operating temperatures to ensure its excellent imaging quality. In other alternative embodiments, each lens may also be made of other materials.

Both an object-side surface and an image-side surface of the first lens L1 are spherical surfaces, and the other lenses are aspheric lenses. Designing the surface of some lenses as spherical surface can reduce manufacturing difficulty.

A refractive index of the first lens L1 is defined as n1, and the following relation is satisfied: $1.70 \leq n1 \leq 2.10$, which specifies the range of the refractive index n1 of the first lens L1. Within the conditional range, it helps to reduce a front-end aperture of the camera optical lens 10 and improve imaging quality.

A central curvature radius of an object-side surface of the second lens L2 is defined as R3, a central curvature radius of an image-side surface of the second lens L2 is defined as R4, and the following relation is satisfied: $3.20 \leq (R3+R4)/(R3-R4) \leq 4.70$, which specifies the shape of the second lens L2. Within the conditional range, it is favorable to alleviating large-angle light and reducing chromatic aberration, so that the chromatic aberration satisfies $|LC| \leq 9$ μm.

A focal length of the third lens L4 is defined as f3, a focal length of the camera optical lens 10 is defined as f, and the following relation is satisfied: $3.00 \leq f3/f \leq 5.00$, which specifies the ratio of the focal length f3 of the third lens L3 to the focal length f of the camera optical lens 10. By allocating the refractive power of the system reasonably, the system has better imaging quality and lower sensitivity.

An on-axis thickness of the fourth lens L4 is defined as d7, an on-axis thickness of the fifth lens L5 is defined as d9, an on-axis distance from an image-side surface of the third lens L3 to an object-side surface of the fourth lens L4 is defined as d6, and the following relation is satisfied: $1.00 \leq (d7+d9)/d6 \leq 2.50$, which specifies the ratio of the on-axis thickness d7 of the fourth lens L4 and the on-axis thickness d9 of the fifth lens L5 to the on-axis distance d6 from the third lens L3 to the fourth lens L4. Within the conditional range, the assembly difficulty in the actual production process can be effectively reduced.

A combined focal length of the fourth lens L4 and the fifth lens L5 is defined as f45, a focal length of the camera optical lens 10 is f, and the following relation is satisfied: $2.10 \leq f45/$ f≤4.00, which specifies the ratio of the combined focal length f45 of the two glued lenses, the fourth lens L4 and the fifth lens L5, to the focal length f of the camera optical lens 10. Within the conditional range, the field curvature of the system can be effectively balanced, so that the field curvature offset of the central field of view is less than 0.01 mm.

A total track length of the camera optical lens 10 is defined as TTL, the focal length of the camera optical lens 10 is defined as f, and the following relation is satisfied: 8.00≤TTL/f≤12.00, which specifies the ratio of the total optical length TTL to the focal length f of the camera optical lens 10. Within the conditional range, it is favorable for miniaturization.

In this embodiment, an object-side surface of the first lens L1 is convex at a paraxial position, an image-side surface of the first lens L1 is concave at the paraxial position, and the first lens L1 has negative refractive power. In other alternative embodiments, the object-side surface and the image-side surface of the first lens L1 may also be configured to be other concave and convex distributions.

A focal length of the first lens L1 is defined as f1, and the following relation is satisfied: −7.82≤f1/f≤−2.30, which specifies the ratio of the focal length f1 of the first lens L1 to the focal length f of the camera optical lens 10. Within this range, it helps to achieve ultra-wide-angle. Optionally, the following relation is satisfied: −4.89≤f1/f≤−2.87.

A central curvature radius of the object-side surface of the first lens L1 is defined as R1, a central curvature radius of the image-side surface of the first lens L1 is defined as R2, and the following relation is satisfied: 0.81≤(R1+R2)/(R1−R2)≤2.63, which specifies the shape of the first lens L1. Within this range, it helps to achieve ultra-wide-angle. Optionally, the following relation is satisfied: 1.30≤(R1+R2)/(R1−R2)≤2.11.

An on-axis thickness of the first lens L1 is d1, the total track length of the camera optical lens 10 is TTL, and the following relation is satisfied: 0.00≤d1/TTL≤0.15. Within the conditional range, it is favorable to achieving miniaturization. Optionally, the following relation is satisfied: 0.00≤d1/TTL≤0.12.

In this embodiment, the object-side surface of the second lens L2 is convex at the paraxial position, the image-side surface of the second lens L2 is concave at the paraxial position, and the second lens L2 has negative refractive power. In other alternative embodiments, the object-side surface and the image-side surface of the second lens L2 may also be configured to be other concave and convex distributions.

In this embodiment, the focal length of the camera optical lens 10 is defined as f, a focal length of the second lens L2 is defined as f2, and the following relation is satisfied: −20.66≤f2/f≤−2.89, which specifies the ratio of the focal length f2 to the focal length of the camera optical lens 10. Within this range, the field curvature of the system can be effectively balanced. Optionally, the following relation is satisfied: −12.91≤f2/f≤−3.61.

An on-axis thickness of the second lens L2 is d3, the total track length of the camera optical lens 10 is TTL, and the following relation is satisfied: 0.02≤d3/TTL≤0.13. Within the conditional range, it is favorable to achieving miniaturization. Optionally, the following relation is satisfied: 0.03≤d3/TTL≤0.10.

In this embodiment, an object-side surface of the third lens L3 is concave at the paraxial position, the image-side surface of the third lens L3 is convex at the paraxial position, and the third lens L3 has positive refractive power. In other alternative embodiments, the object-side surface and the image-side surface of the third lens L3 may also be configured to be other concave and convex distributions.

A central curvature radius of the object-side surface of the third lens L3 is defined as R5, a central curvature radius of the image-side surface of the third lens L3 is defined as R6, and the following relation is satisfied: 0.83≤(R5+R6)/(R5−R6)≤2.98, which specifies the shape of the third lens L3. Within this range, the degree of deflection can be reduced, and the chromatic aberration can be effectively corrected. Optionally, the following relation is satisfied: 1.34≤(R5+R6)/(R5−R6)≤2.38.

An on-axis thickness of the third lens L3 is d5, the total track length of the camera optical lens 10 is TTL, and the following relation is satisfied: 0.04≤d5/TTL≤0.18. Within the conditional range, it is favorable to achieving miniaturization. Optionally, the following relation is satisfied: 0.06≤d5/TTL≤0.15.

In this embodiment, the object-side surface of the fourth lens L4 is convex at the paraxial position, an image-side surface of the fourth lens L4 is concave at the paraxial position, and the fourth lens L4 has negative refractive power. In other alternative embodiments, the object-side surface and the image-side surface of the fourth lens L4 may also be configured to be other concave and convex distributions.

The focal length of the camera optical lens 10 is defined as f, a focal length of the fourth lens L4 is defined as f4, and the following relation is satisfied: −9.83≤f4/f≤−1.83. By allocating the refractive power reasonably, the system has better imaging quality and lower sensitivity. Optionally, the following relation is satisfied: −6.14≤f4/f≤−2.29.

A central curvature radius of the object-side surface of the fourth lens L4 is defined as R7, a central curvature radius of the image-side surface of the fourth lens L4 is defined as R8, and the following relation is satisfied: 1.00≤(R7+R8)/(R7−R8)≤3.74, which specifies the shape of the fourth lens L4. Within this range, with the development of ultra-thin and wide-angle, it is favorable to correcting the aberration of the off-axis angle. Optionally, the following relation is satisfied: 1.60≤(R7+R8)/(R7−R8)≤2.99.

An on-axis thickness of the fourth lens L4 is d7, the total track length of the camera optical lens 10 is TTL, and the following relation is satisfied: 0.02≤d7/TTL≤0.10. Within the conditional range, it is favorable to achieving miniaturization. Optionally, the following relation is satisfied: 0.03≤d7/TTL≤0.08.

In this embodiment, an object-side surface of the fifth lens L5 is convex at the paraxial position, an image-side surface of the fifth lens L5 is convex at the paraxial position, and the fifth lens L5 has positive refractive power. In other alternative embodiments, the object-side surface and the image-side surface of the fifth lens L5 may also be configured to be other concave and convex distributions.

The focal length of the camera optical lens 10 is defined as f, a focal length of the fourth lens L5 is defined as f5, and the following relation is satisfied: 0.66≤f5/f≤3.20. The limitations to the fifth lens L5 can effectively flatten the light angle of the camera optical lens 10 and reduce tolerance sensitivity. Optionally, the following relation is satisfied: 1.05≤f5/f≤2.56.

A central curvature radius of the object-side surface of the fifth lens L5 is defined as R9, a central curvature radius of the image-side surface of the fifth lens L5 is defined as R10, and the following relation is satisfied: −0.40≤(R9+R10)/(R9−R10)≤−0.02, which specifies a shape of the fifth lens. Within this range, with the development of ultra-thin and wide-angle, it is favorable to correcting the aberration of the off-axis angle. Optionally, the following relation is satisfied: −0.25≤(R9+R10)/(R9−R10)≤−0.03.

An on-axis thickness of the fifth lens L5 is d9, the total track length of the camera optical lens 10 is TTL, and the following relation is satisfied: 0.06≤d9/TTL≤0.22. Within the conditional range, it is favorable to achieving miniaturization. Optionally, the following relation is satisfied: 0.09≤d9/TTL≤0.17.

In this embodiment, a field of view in a diagonal direction of the camera optical lens 10 is FOV, and the following relation is satisfied: FOV≥194°, which is favorable to achieving wide-angle.

In this embodiment, an image height of the camera optical lens 10 is defined as IH, the total track length of the camera optical lens 10 is TTL, and the following relation is satisfied: TTL/IH≤6.08, which is favorable to achieving miniaturization. Optionally, the following relation is satisfied: TTL/IH≤5.91.

In this embodiment, an aperture value FNO of the camera optical lens 10 is less than or equal to 1.80, thereby achieving a large aperture and good imaging performance of the camera optical lens 10.

The camera optical lens 10 not only has good optical performance, but also meets the design requirements of large aperture, ultra-thin, and ultra-wide-angle. According to the characteristics of the camera optical lens 10, it is particularly suitable for camera lens assembly, composed of high pixel CCD, CMOS and other camera elements, of mobile phone, WEB camera lens, and camera lens for unmanned aerial vehicle.

The camera optical lens 10 of the present disclosure will be described below with examples. The reference signs recited in each example are shown below. The units of the focal length, the on-axis distance, the central curvature radius, the on-axis thickness, an inflection point position, and an arrest point position are mm.

TTL: total track length (the on-axis distance from the object-side of the first lens L1 to the image plane Si), the unit thereof is mm.

Aperture value FNO: the ratio of the effective focal length of the camera optical lens 10 to an entrance pupil diameter.

Optionally, the inflection point and the arrest point may be provided on the object-side surface and/or the image-side surface of the lens, so as to meet high-quality imaging requirements. The specific implementation is described below.

Table 1 and Table 2 show design data of the camera optical lens 10 according to the first embodiment of the present disclosure.

TABLE 1

| | R | | d | | nd | | vd |
|---|---|---|---|---|---|---|---|
| S1 | ∞ | d0= | −4.944 | | | | |
| R1 | 8.014 | d1= | 0.600 | nd1 | 1.9108 | v1 | 35.25 |
| R2 | 2.072 | d2= | 0.683 | | | | |
| R3 | 1.080 | d3= | 0.571 | nd2 | 1.5444 | v2 | 55.82 |
| R4 | 0.627 | d4= | 1.473 | | | | |
| R5 | −4.838 | d5= | 0.755 | nd3 | 1.6613 | v3 | 20.37 |
| R6 | −1.577 | d6= | 0.803 | | | | |
| R7 | 2.893 | d7= | 0.400 | nd4 | 1.6613 | v4 | 20.37 |
| R8 | 1.188 | d8= | 0.000 | | | | |
| R9 | 1.188 | d9= | 1.041 | nd5 | 1.5444 | v5 | 55.82 |
| R10 | −1.359 | d10= | 1.324 | | | | |
| R11 | ∞ | d11= | 0.210 | ndg | 1.5233 | vg | 54.52 |
| R12 | ∞ | d12= | 0.141 | | | | |

The meanings of each sign are as follows.

S1: aperture;
R: the curvature radius at the center of the optical surface;
R1: the central curvature radius of the object-side surface of the first lens L1;
R2: the central curvature radius of the image-side surface of the first lens L1;
R3: the central curvature radius of the object-side surface of the second lens L2;
R4: the central curvature radius of the image-side surface of the second lens L2;
R5: the central curvature radius of the object-side surface of the third lens L3;
R6: the central curvature radius of the image-side surface of the third lens L3;
R7: the central curvature radius of the object-side surface of the fourth lens L4;
R8: the central curvature radius of the image-side surface of the fourth lens L4;
R9: the central curvature radius of the object-side surface of the fifth lens L5;
R10: the central curvature radius of the image-side surface of the fifth lens L5;
R11: the central curvature radius of the object-side surface of the grating filter GF;
R12: the central curvature radius of the image-side surface of the grating filter GF;
d: the on-axis thickness of the lens or the on-axis distance between lenses;
d0: the on-axis distance from the aperture S1 to the object-side surface of the first lens L1;
d1: the on-axis thickness of the first lens L1;
d2: the on-axis distance from the image-side surface of the first lens L1 to the object-side surface of the second lens L2;
d3: the on-axis thickness of the second lens L2;
d4: the on-axis distance from the image-side surface of the second lens L2 to the object-side surface of the third lens L3;
d5: the on-axis thickness of the third lens L3;
d6: the on-axis distance from the image-side surface of the third lens L3 to the object-side surface of the fourth lens L4;
d7: the on-axis thickness of the fourth lens L4;
d8: the on-axis distance from the image-side surface of the fourth lens L4 to the object-side surface of the fifth lens L5;
d9: the on-axis thickness of the fifth lens L5;
d10: the on-axis distance from the image-side surface of the fifth lens L5 to the object-side surface of the grating filter GF;
d11: the on-axis thickness of the grating filter GF;
d12: the on-axis distance from the image-side surface of the grating filter GF to the image plane Si;
nd: the refractive index of d-line (d-line is green light with a wavelength of 550 nm);
nd1: the refractive index of d-line of the first lens L1;
nd2: the refractive index of d-line of the second lens L2;
nd3: the refractive index of d-line of the third lens L3;
nd4: the refractive index of d-line of the fourth lens L4;
nd5: the refractive index of d-line of the fifth lens L5;
ndg: the refractive index of d-line of the grating filter GF;
vd: Abbe number;
v1: the Abbe number of the first lens L1;
v2: the Abbe number of the second lens L2;
v3: the Abbe number of the third lens L3;
v4: the Abbe number of the fourth lens L4;
v5: the Abbe number of the fifth lens L5;
vg: the Abbe number of grating filter GF.

Table 2 shows aspheric surface data of each lens of the camera optical lens 10 according to the first embodiment of the present disclosure.

TABLE 2

| | Conic coefficient | Aspheric coefficient | | | | |
|---|---|---|---|---|---|---|
| | k | A4 | A6 | A8 | A10 | A12 |
| R3 | −1.0375E+00 | 1.8323E−01 | −2.1284E−01 | 3.9976E−01 | −5.8386E−01 | 4.2780E−01 |
| R4 | −1.5894E+00 | 8.5413E−01 | −6.3563E−01 | 8.5919E−01 | −2.8701E+00 | 4.1012E+00 |
| R5 | −1.0552E+01 | 5.6484E−02 | −6.2694E−02 | 1.8574E−01 | −2.8794E−01 | 2.2561E−01 |
| R6 | −4.4364E+00 | −1.1058E−02 | −9.8479E−03 | 7.8703E−02 | −2.0424E−01 | 2.8362E−01 |
| R7 | −2.1986E+01 | 3.1783E−01 | 5.5479E−02 | −5.1333E+00 | 3.6893E+01 | −1.7397E+02 |
| R8 | −2.1990E−01 | 1.2657E+00 | −1.2733E+00 | −3.3530E+00 | 2.1133E+01 | −9.8371E+01 |
| R9 | −2.1990E−01 | 1.2657E+00 | −1.2733E+00 | −3.3530E+00 | 2.1133E+01 | −9.8371E+01 |
| R10 | −9.2950E−01 | 6.2860E−02 | −6.0132E−01 | 4.6371E+00 | −2.0955E+01 | 5.9948E+01 |

| | Conic coefficient | Aspheric coefficient | | | |
|---|---|---|---|---|---|
| | k | A14 | A16 | A18 | A20 |
| R3 | −1.0375E+00 | −1.7345E−01 | 4.0246E−02 | −5.0341E−03 | 2.6406E−04 |
| R4 | −1.5894E+00 | −2.9438E+00 | 1.1485E+00 | −2.3268E−01 | 1.9071E−02 |
| R5 | −1.0552E+01 | −7.4119E−02 | −5.3055E−03 | 9.2509E−03 | −1.6162E−03 |
| R6 | −4.4364E+00 | −2.2565E−01 | 1.0440E−01 | −2.6502E−02 | 2.8836E−03 |
| R7 | −2.1986E+01 | 5.6012E+02 | −1.1729E+03 | 1.4271E+03 | −7.5666E+02 |
| R8 | −2.1990E−01 | 3.0865E+02 | −5.6654E+02 | 5.4891E+02 | −2.1926E+02 |
| R9 | −2.1990E−01 | 3.0865E+02 | −5.6654E+02 | 5.4891E+02 | −2.1926E+02 |
| R10 | −9.2950E−01 | −1.1064E+02 | 1.2951E+02 | −8.7926E+01 | 2.6656E+01 |

For convenience, the aspheric surface of each lens surface uses the aspheric surface shown in the following equation (1). However, the present disclosure is not limited to the form of the aspheric surface polynomial shown in equation (1).

$$z=(cr^2)/\left\{1+\left[1-(k+1)(c^2r^2)\right]^{1/2}\right\}+A4r^4+A6r^6+A8r^8+A10r^{10}+A12r^{12}+A14r^{14}+A16r^{16}+A18r^{18}+A20r^{20} \quad (1)$$

In equation (1) above, k is the conic coefficient, A4, A6, A8, A10, A12, A14, A16, A18, A20 are the aspheric coefficients, c is the curvature at the center of the optical surface, r is the vertical distance between the point on the curved line of the aspheric surface and an optical axis, and z is a depth of the aspheric surface (the vertical distance between the point on the aspheric surface, with a distance of r from the optical axis, and the tangent plane to the vertex on the aspheric surface)

Table 3 and Table 4 show design data of inflection points and arrest points of each lens of the camera optical lens 10 according to the first embodiment of the present disclosure. P1R1 and P1R2 represent the object-side surface and the image-side surface of the first lens L1, respectively. P2R1 and P2R2 represent the object-side surface and the image-side surface of the second lens L2, respectively. P3R1 and P3R2 represent the object-side surface and the image-side surface of the third lens L3, respectively. P4R1 and P4R2 represent the object-side surface and the image-side surface of the fourth lens L4, respectively. P5R1 and P5R2 represent the object-side surface and the image-side surface of the fifth lens L5, respectively. The data corresponding to the column "inflection point position" is the vertical distance from the inflection point provided on the surface of each lens to the optical axis of the camera optical lens 10. The data corresponding to the column "arrest point position" is a vertical distance from the arrest point provided on the surface of each lens to the optical axis of the camera optical lens 10.

TABLE 3

| | The number of inflection points | Inflection point position 1 | Inflection point position 2 |
|---|---|---|---|
| P1R1 | 0 | / | / |
| P1R2 | 0 | / | / |
| P2R1 | 1 | 0.965 | / |
| P2R2 | 1 | 0.815 | / |
| P3R1 | 2 | 0.565 | 1.295 |
| P3R2 | 0 | / | / |
| P4R1 | 0 | / | / |
| P4R2 | 1 | 0.655 | / |
| P5R1 | 1 | 0.655 | / |
| P5R2 | 1 | 0.725 | / |

TABLE 4

| | The number of arrest points | Arrest point position 1 |
|---|---|---|
| P1R1 | 0 | / |
| P1R2 | 0 | / |
| P2R1 | 1 | 1.615 |
| P2R2 | 0 | / |
| P3R1 | 1 | 1.005 |
| P3R2 | 0 | / |
| P4R1 | 0 | / |
| P4R2 | 0 | / |
| P5R1 | 0 | / |
| P5R2 | 0 | / |

Figure 2:
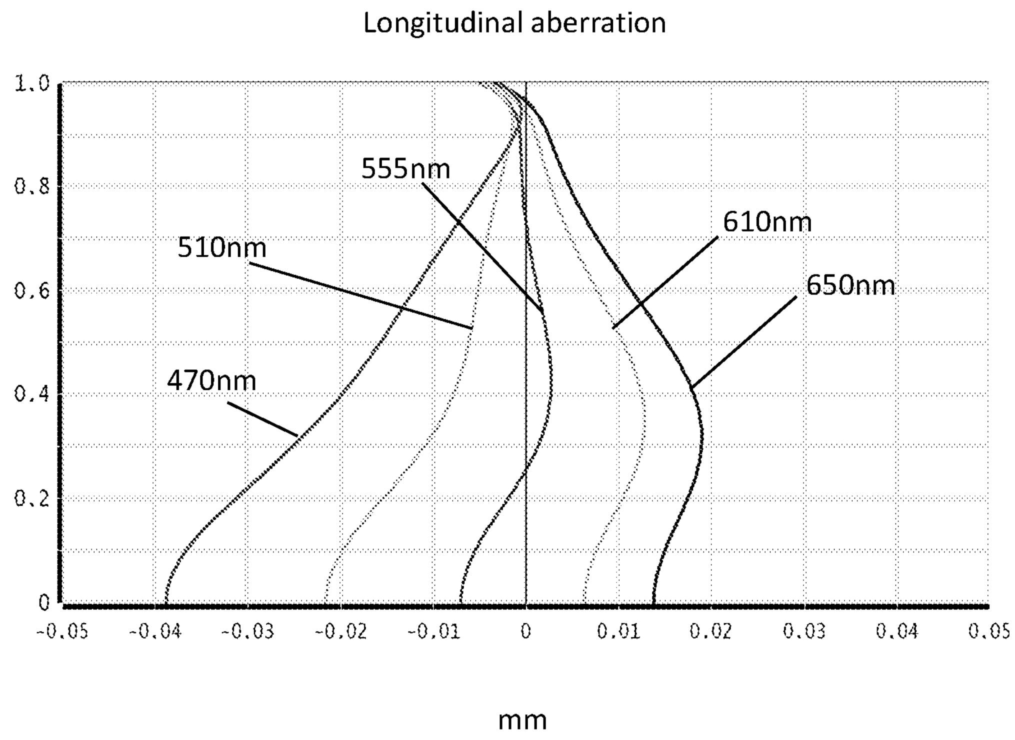
FIG. 2 is a schematic diagram of a longitudinal aberration of the camera optical lens shown in FIG. 1.
Figure 3:
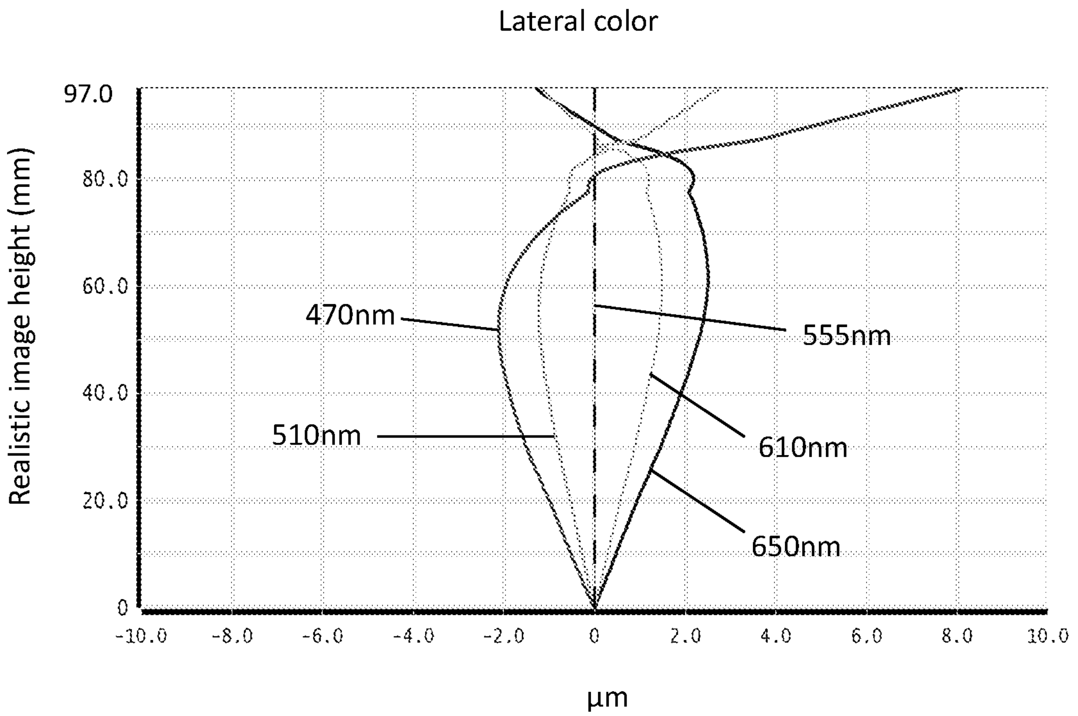
FIG. 3 is a schematic diagram of lateral color of the camera optical lens shown in FIG. 1.
Figure 4:
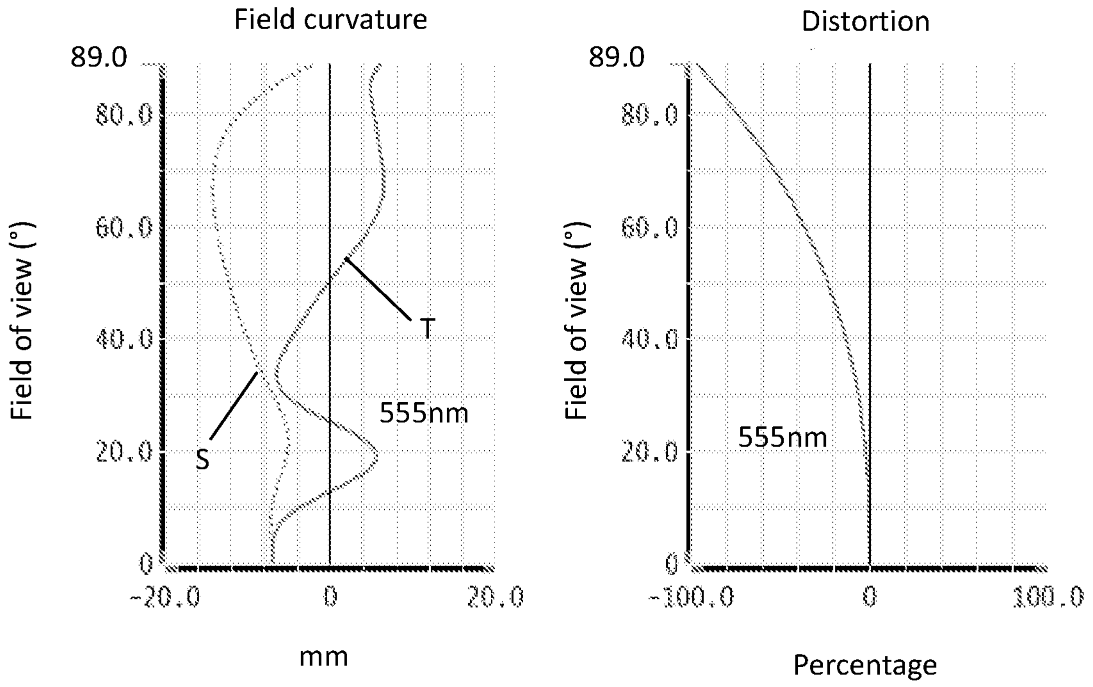
FIG. 4 is a schematic diagram of a field curvature and a distortion of the camera optical lens shown in FIG. 1.

FIG. 2 and FIG. 3 show schematic diagrams of a longitudinal aberration and a lateral color of light with wavelengths of 470 nm, 510 nm, 555 nm, 610 nm and 650 nm after passing through the camera optical lens 10 according to the first embodiment, respectively. FIG. 4 shows a field curvature and a distortion of light with a wavelength of 555 nm after passing through the camera optical lens 10 according to the first embodiment. The field curvature S in FIG. 4 is a field curvature in a sagittal direction, and the field curvature T is a field curvature in a meridian direction.

The following Table 29 shows the values, corresponding to the parameters specified in the conditional, for various values in each embodiment.

As shown in Table 29, the first embodiment satisfies each conditional.

In this embodiment, the entrance pupil diameter ENPD of the camera optical lens 10 is 0.463 mm, the full-field image height IH is 1.382 mm, and the field of view FOV in the diagonal direction is 194.00°. The camera optical lens 10 meets the design requirements of large aperture, ultra-thin, and ultra-wide-angle, and has excellent optical characteristics.

Second Embodiment

The second embodiment is substantially the same as the first embodiment, and the meanings of reference signs are the same as those of the first embodiment. Only differences are listed below.

Figure 5:
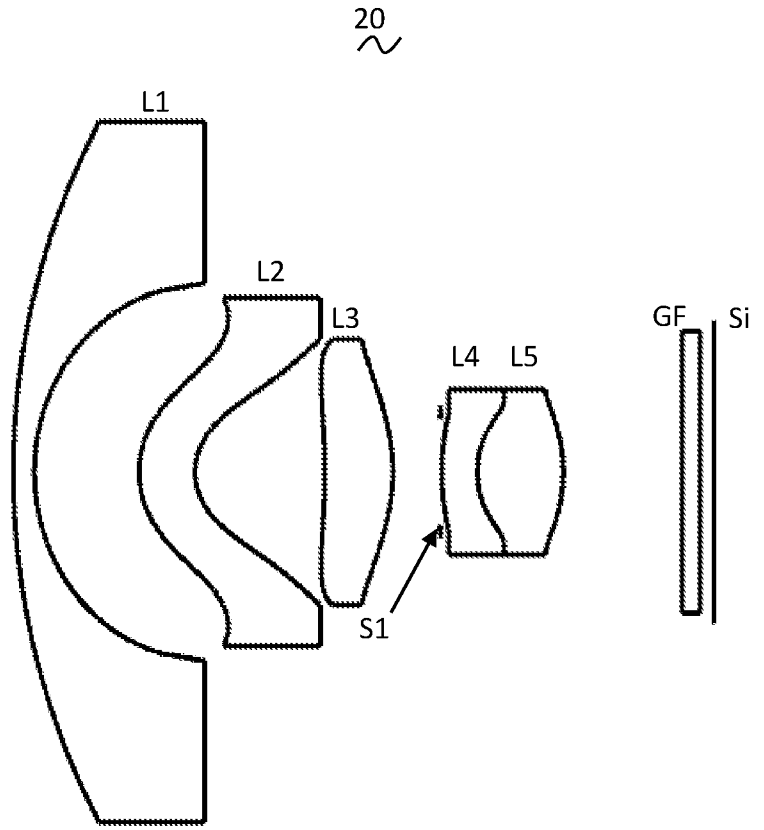
FIG. 5 is a structural schematic diagram of a camera optical lens according to a second embodiment of the present disclosure.

FIG. 5 shows a camera optical lens 20 according to the second embodiment of the present disclosure.

Table 5 and Table 6 show design data of the camera optical lens 20 according to the second embodiment of the present disclosure.

TABLE 5

| | R | | d | | nd | | vd |
|---|---|---|---|---|---|---|---|
| S1 | ∞ | d0= | −4.993 | | | | |
| R1 | 7.168 | d1= | 0.237 | nd1 | 1.7000 | v1 | 48.11 |
| R2 | 1.934 | d2= | 1.187 | | | | |
| R3 | 0.902 | d3= | 0.634 | nd2 | 1.5444 | v2 | 55.82 |
| R4 | 0.583 | d4= | 1.472 | | | | |
| R5 | −5.624 | d5= | 0.773 | nd3 | 1.6613 | v3 | 20.37 |
| R6 | −1.679 | d6= | 0.556 | | | | |
| R7 | 3.032 | d7= | 0.402 | nd4 | 1.6613 | v4 | 20.37 |
| R8 | 1.071 | d8= | 0.000 | | | | |
| R9 | 1.071 | d9= | 0.973 | nd5 | 1.5444 | v5 | 55.82 |
| R10 | −1.427 | d10= | 1.344 | | | | |
| R11 | ∞ | d11= | 0.210 | ndg | 1.5233 | vg | 54.52 |
| R12 | ∞ | d12= | 0.155 | | | | |

Table 6 shows aspheric surface data of each lens of the camera optical lens 20 according to the second embodiment of the present disclosure.

TABLE 6

| | Conic coefficient | Aspheric coefficient | | | | |
|---|---|---|---|---|---|---|
| | k | A4 | A6 | A8 | A10 | A12 |
| R3 | −1.0550E+00 | 1.8096E−01 | −2.1280E−01 | 3.9970E−01 | −5.8393E−01 | 4.2778E−01 |
| R4 | −1.5746E+00 | 8.5598E−01 | −6.3279E−01 | 8.5904E−01 | −2.8705E+00 | 4.1014E+00 |
| R5 | −9.1601E+00 | 5.2481E−02 | −6.3713E−02 | 1.8635E−01 | −2.8722E−01 | 2.2600E−01 |
| R6 | −5.1398E+00 | −5.7198E−03 | −9.1434E−03 | 7.8538E−02 | −2.0457E−01 | 2.8356E−01 |
| R7 | −1.9087E+01 | 3.0142E−01 | 3.7508E−02 | −5.1536E+00 | 3.6875E+01 | −1.7406E+02 |
| R8 | −1.8629E−01 | 1.1905E+00 | −1.8677E+00 | −3.5039E+00 | 2.1227E+01 | −9.8948E+01 |
| R9 | −1.8629E−01 | 1.1905E+00 | −1.8677E+00 | −3.5039E+00 | 2.1227E+01 | −9.8948E+01 |
| R10 | −8.2757E−01 | 5.6882E−02 | −6.0270E−01 | 4.6335E+00 | −2.0899E+01 | 6.0050E+01 |

| | Conic coefficient | Aspheric coefficient | | | |
|---|---|---|---|---|---|
| | k | A14 | A16 | A18 | A20 |
| R3 | −1.0550E+00 | −1.7347E−01 | 4.0244E−02 | −5.0340E−03 | 2.6421E−04 |
| R4 | −1.5746E+00 | −2.9438E+00 | 1.1485E+00 | −2.3265E−01 | 1.9073E−02 |
| R5 | −9.1601E+00 | −7.3970E−02 | −5.2316E−03 | 9.3166E−03 | −1.5495E−03 |
| R6 | −5.1398E+00 | −2.2552E−01 | 1.0444E−01 | −2.6456E−02 | 2.9043E−03 |
| R7 | −1.9087E+01 | 5.5976E+02 | −1.1736E+03 | 1.4270E+03 | −7.4434E+02 |
| R8 | −1.8629E−01 | 3.1055E+02 | −5.6339E+02 | 5.4945E+02 | −2.2928E+02 |
| R9 | −1.8629E−01 | 3.1055E+02 | −5.6339E+02 | 5.4945E+02 | −2.2928E+02 |
| R10 | −8.2757E−01 | −1.1054E+02 | 1.2952E+02 | −8.8103E+01 | 2.6643E+01 |

Table 7 and Table 8 show design data of inflection points and arrest points of each lens of the camera optical lens 20 according to the second embodiment of the present disclosure.

TABLE 7

| | The number of inflection points | Inflection point position 1 |
|---|---|---|
| P1R1 | 0 | / |
| P1R2 | 0 | / |
| P2R1 | 1 | 0.975 |
| P2R2 | 1 | 0.825 |
| P3R1 | 1 | 0.565 |
| P3R2 | 1 | 1.045 |
| P4R1 | 0 | / |
| P4R2 | 1 | 0.555 |
| P5R1 | 1 | 0.555 |
| P5R2 | 0 | / |

TABLE 8

| | The number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.965 |
| P3R2 | 0 | / |
| P4R1 | 0 | / |
| P4R2 | 0 | / |
| P5R1 | 0 | / |
| P5R2 | 0 | / |

Figure 6:
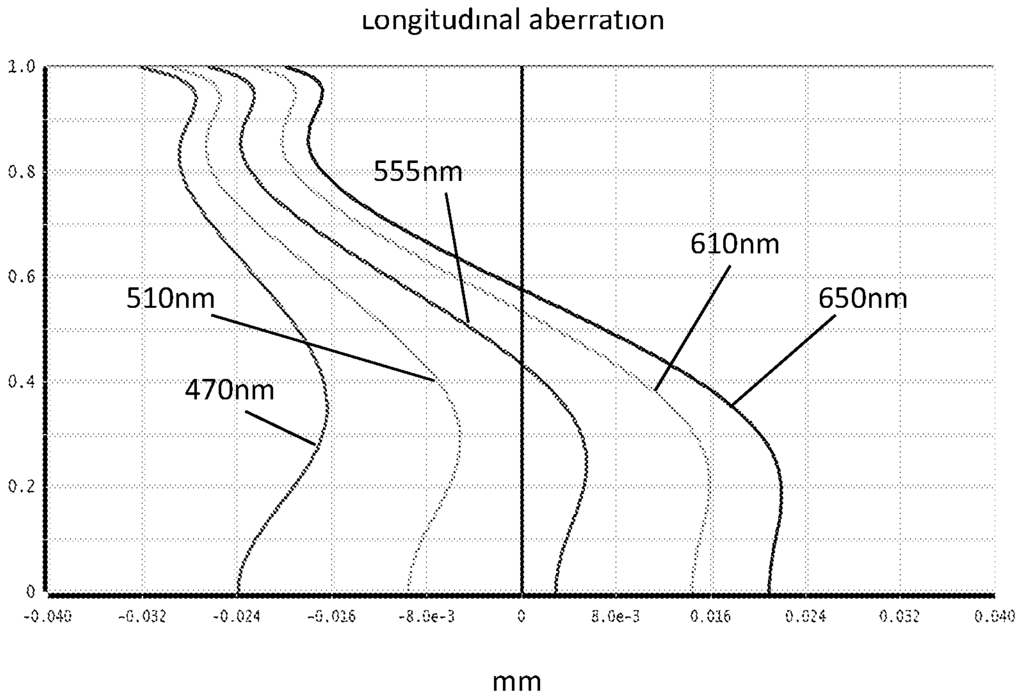
FIG. 6 is a schematic diagram of a longitudinal aberration of the camera optical lens shown in FIG. 5.
Figure 7:
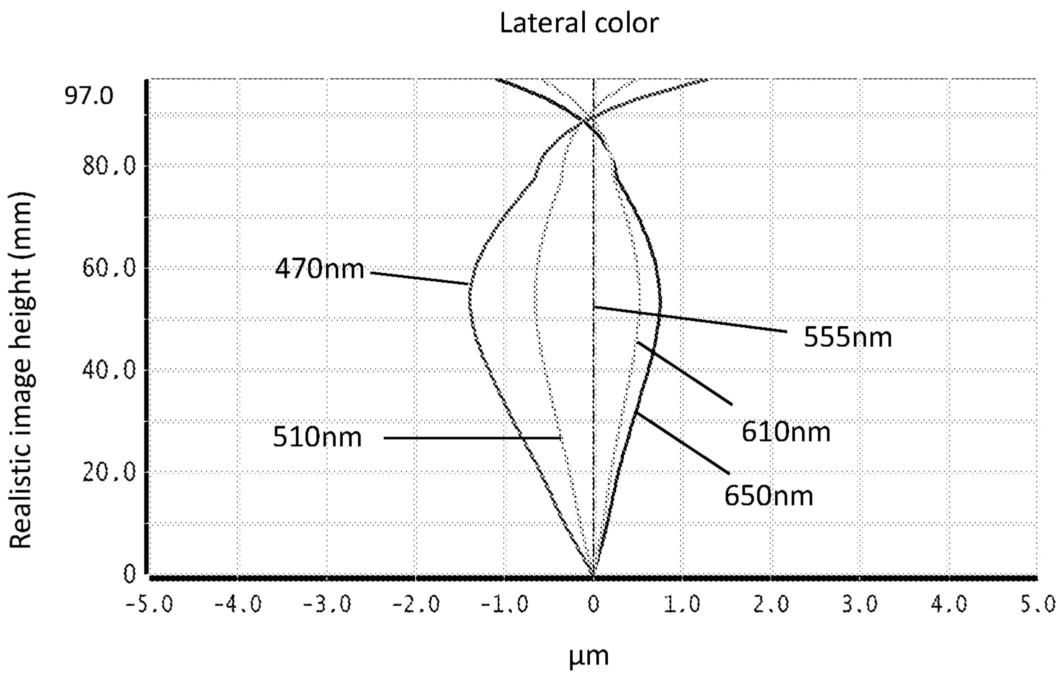
FIG. 7 is a schematic diagram of lateral color of the camera optical lens shown in FIG. 5.
Figure 8:
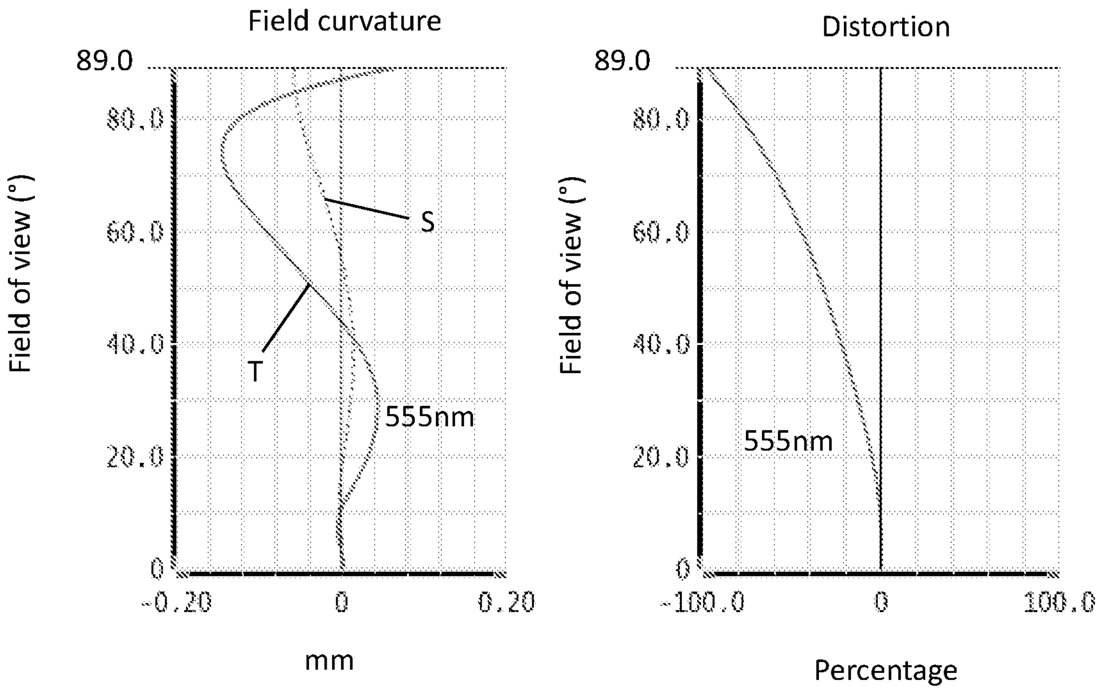
FIG. 8 is a schematic diagram of a field curvature and a distortion of the camera optical lens shown in FIG. 5.

FIG. 6 and FIG. 7 show schematic diagrams of a longitudinal aberration and a lateral color of light with wavelengths of 470 nm, 510 nm, 555 nm, 610 nm and 650 nm after passing through the camera optical lens 20 according to the second embodiment, respectively. FIG. 8 shows a field curvature and a distortion of light with a wavelength of 555 nm after passing through the camera optical lens 20 according to the second embodiment. The field curvature S in FIG. 8 is a field curvature in a sagittal direction, and the field curvature T is a field curvature in a meridian direction.

As shown in Table 29, the second embodiment satisfies each conditional.

In this embodiment, the entrance pupil diameter ENPD of the camera optical lens 20 is 0.548 mm, the full-field image height IH is 1.382 mm, and the field of view FOV in the diagonal direction is 194.00°. The camera optical lens 20 meets the design requirements of large aperture, ultra-thin, and ultra-wide-angle, and has excellent optical characteristics.

Third Embodiment

The third embodiment is substantially the same as the first embodiment, and the meanings of reference signs are the same as those of the first embodiment. Only differences are listed below.

Figure 9:
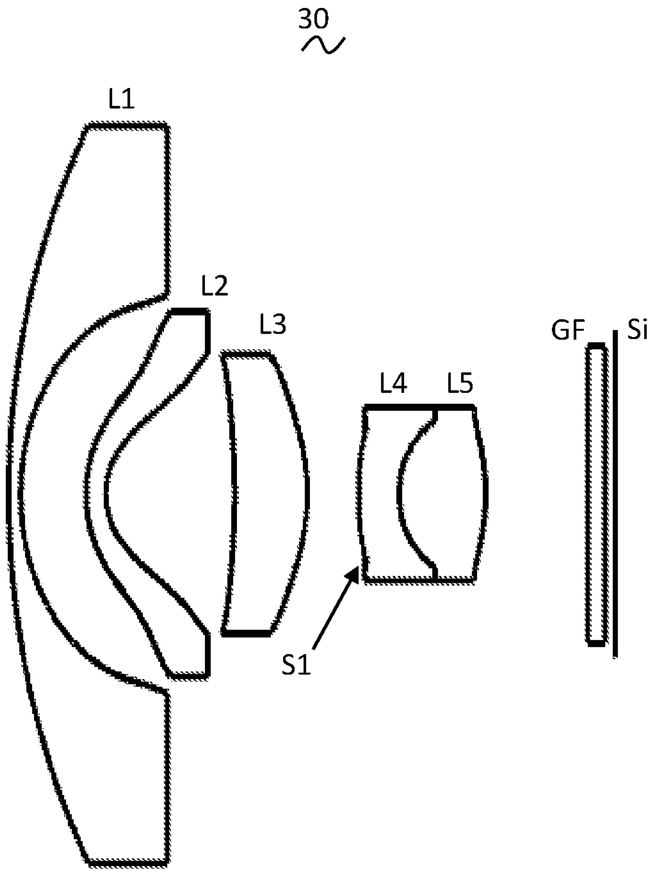
FIG. 9 is a structural schematic diagram of a camera optical lens according to a third embodiment of the present disclosure.

FIG. 9 shows a camera optical lens 30 according to the third embodiment of the present disclosure.

Table 9 and Table 10 show design data of the camera optical lens 30 according to the third embodiment of the present disclosure.

TABLE 9

| | R | | d | | nd | | vd |
|---|---|---|---|---|---|---|---|
| S1 | ∞ | d0= | −4.474 | | | | |
| R1 | 6.881 | d1= | 0.041 | nd1 | 2.0371 | v1 | 61.68 |
| R2 | 1.886 | d2= | 0.846 | | | | |
| R3 | 1.151 | d3= | 0.251 | nd2 | 1.5444 | v2 | 55.82 |
| R4 | 0.604 | d4= | 1.652 | | | | |
| R5 | −5.853 | d5= | 0.936 | nd3 | 1.6613 | v3 | 20.37 |
| R6 | −1.467 | d6= | 0.654 | | | | |
| R7 | 3.196 | d7= | 0.526 | nd4 | 1.6613 | v4 | 20.37 |
| R8 | 1.065 | d8= | 0.000 | | | | |
| R9 | 1.065 | d9= | 1.107 | nd5 | 1.5444 | v5 | 55.82 |
| R10 | −1.593 | d10= | 1.316 | | | | |
| R11 | ∞ | d11= | 0.210 | ndg | 1.5233 | vg | 54.52 |
| R12 | ∞ | d12= | 0.131 | | | | |

Table 10 shows aspheric surface data of each lens of the camera optical lens 30 according to the third embodiment of the present disclosure.

TABLE 10

| | Conic coefficient | Aspheric coefficient | | | | |
|---|---|---|---|---|---|---|
| | k | A4 | A6 | A8 | A10 | A12 |
| R3 | −1.0353E+00 | 1.8704E−01 | −2.1132E−01 | 4.0142E−01 | −5.8350E−01 | 4.2784E−01 |
| R4 | −1.7361E+00 | 8.6073E−01 | −6.3760E−01 | 8.5630E−01 | −2.8713E+00 | 4.1012E+00 |
| R5 | 1.2317E+01 | 3.4403E−02 | −6.7779E−02 | 1.8660E−01 | −2.8726E−01 | 2.2606E−01 |
| R6 | −4.3726E+00 | −7.6727E−03 | −8.9239E−03 | 7.7673E−02 | −2.0506E−01 | 2.8341E−01 |
| R7 | −9.3377E+00 | 3.4453E−01 | 8.9329E−02 | −5.1147E+00 | 3.6884E+01 | −1.7401E+02 |
| R8 | −1.4016E−01 | 1.2694E+00 | −1.2498E+00 | −2.9917E+00 | 2.1731E+01 | −9.8074E+01 |
| R9 | −1.4016E−01 | 1.2694E+00 | −1.2498E+00 | −2.9917E+00 | 2.1731E+01 | −9.8074E+01 |
| R10 | −2.0931E+00 | 1.0438E−01 | −5.8558E−01 | 4.6533E+00 | −2.0950E+01 | 5.9941E+01 |

| | Conic coefficient | Aspheric coefficient | | | |
|---|---|---|---|---|---|
| | k | A14 | A16 | A18 | A20 |
| R3 | −1.0353E+00 | −1.7345E−01 | 4.0240E−02 | −5.0363E−03 | 2.6445E−04 |
| R4 | −1.7361E+00 | −2.9435E+00 | 1.1486E+00 | −2.3259E−01 | 1.9060E−02 |
| R5 | 1.2317E+01 | −7.4052E−02 | −5.4785E−03 | 9.2180E−03 | −1.6436E−03 |
| R6 | −4.3726E+00 | −2.2538E−01 | 1.0432E−01 | −2.6455E−02 | 2.7801E−03 |
| R7 | −9.3377E+00 | 5.6008E+02 | −1.1727E+03 | 1.4271E+03 | −7.5746E+02 |
| R8 | −1.4016E−01 | 3.0830E+02 | −5.6756E+02 | 5.4754E+02 | −2.1929E+02 |
| R9 | −1.4016E−01 | 3.0830E+02 | −5.6756E+02 | 5.4754E+02 | −2.1929E+02 |
| R10 | −2.0931E+00 | −1.1065E+02 | 1.2951E+02 | −8.7937E+01 | 2.6606E+01 |

Table 11 and Table 12 show design data of inflection points and arrest points of each lens of the camera optical lens 30 according to the third embodiment of the present disclosure.

TABLE 11

| | The number of inflection points | Inflection point position 1 | Inflection point position 2 |
|---|---|---|---|
| P1R1 | 0 | / | / |
| P1R2 | 0 | / | / |
| P2R1 | 2 | 0.985 | 1.475 |
| P2R2 | 2 | 0.805 | 1.275 |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 0 | / | / |

TABLE 12

| | The number of arrest points |
|---|---|
| P1R1 | 0 |
| P1R2 | 0 |
| P2R1 | 0 |
| P2R2 | 0 |
| P3R1 | 0 |
| P3R2 | 0 |
| P4R1 | 0 |
| P4R2 | 0 |
| P5R1 | 0 |
| P5R2 | 0 |

Figure 10:
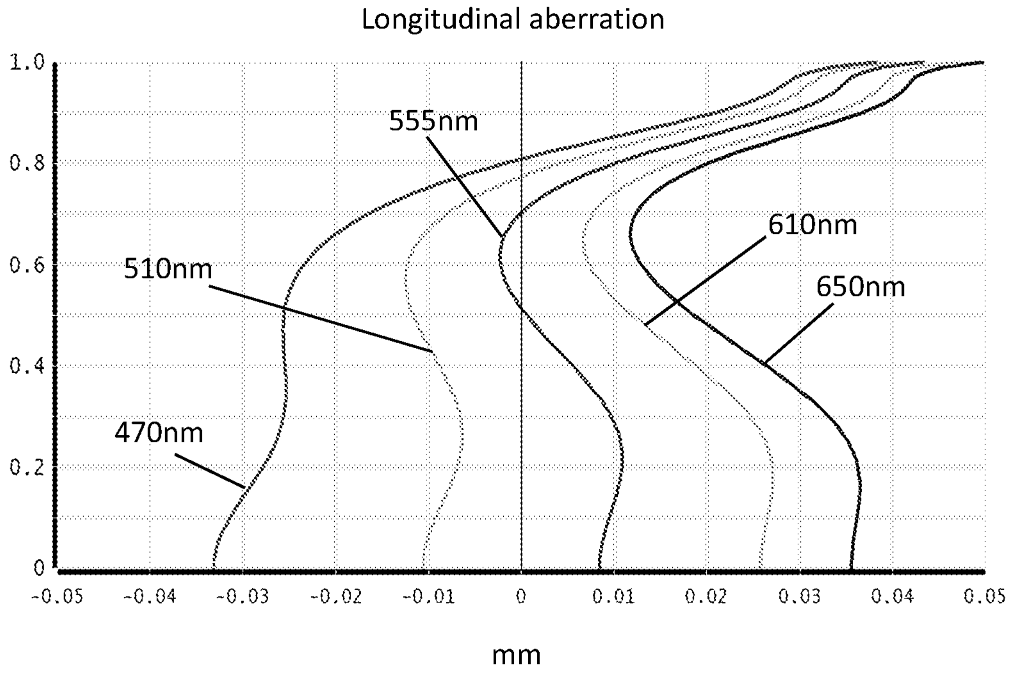
FIG. 10 is a schematic diagram of a longitudinal aberration of the camera optical lens shown in FIG. 9.
Figure 11:
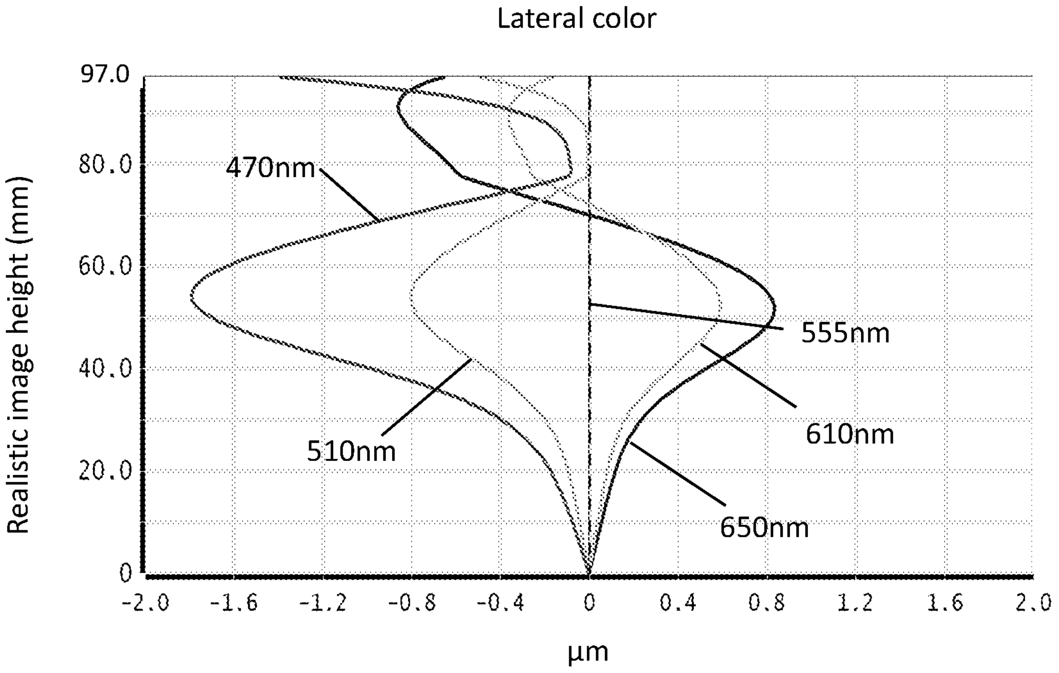
FIG. 11 is a schematic diagram of lateral color of the camera optical lens shown in FIG. 9.
Figure 12:
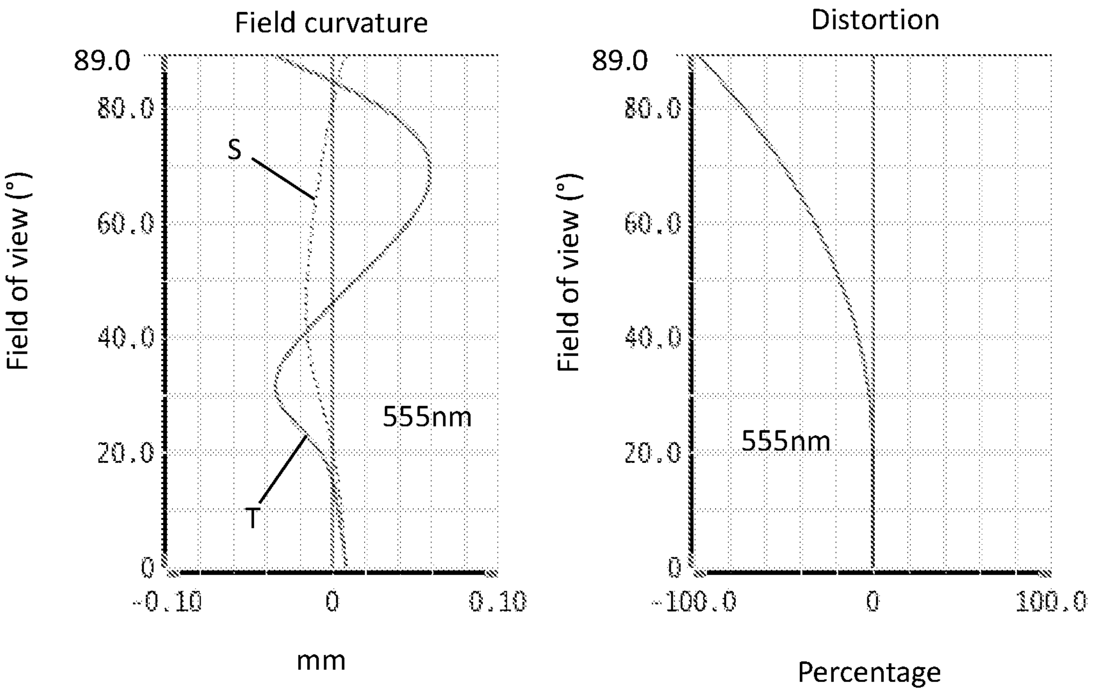
FIG. 12 is a schematic diagram of a field curvature and a distortion of the camera optical lens shown in FIG. 9.

FIG. 10 and FIG. 11 show schematic diagrams of a longitudinal aberration and a lateral color of light with wavelengths of 470 nm, 510 nm, 555 nm, 610 nm and 650 nm after passing through the camera optical lens 30 according to the third embodiment, respectively. FIG. 12 shows a field curvature and a distortion of light with a wavelength of 555 nm after passing through the camera optical lens 30 according to the third embodiment. The field curvature S in FIG. 12 is a field curvature in a sagittal direction, and the field curvature T is a field curvature in a meridian direction.

The following Table 29 lists the values corresponding to each conditional in this embodiment according to the above conditionals. It is apparent that, the camera optical lens 30 of this embodiment satisfies the above conditionals.

In this embodiment, the entrance pupil diameter ENPD of the camera optical lens 30 is 0.356 mm, the full-field image height IH is 1.382 mm, and the field of view FOV in the diagonal direction is 194.00°. The camera optical lens 30 meets the design requirements of large aperture, ultra-thin, and ultra-wide-angle, and has excellent optical characteristics.

Fourth Embodiment

The fourth embodiment is substantially the same as the first embodiment, and the meanings of reference signs are the same as those of the first embodiment. Only differences are listed below.

Figure 13:
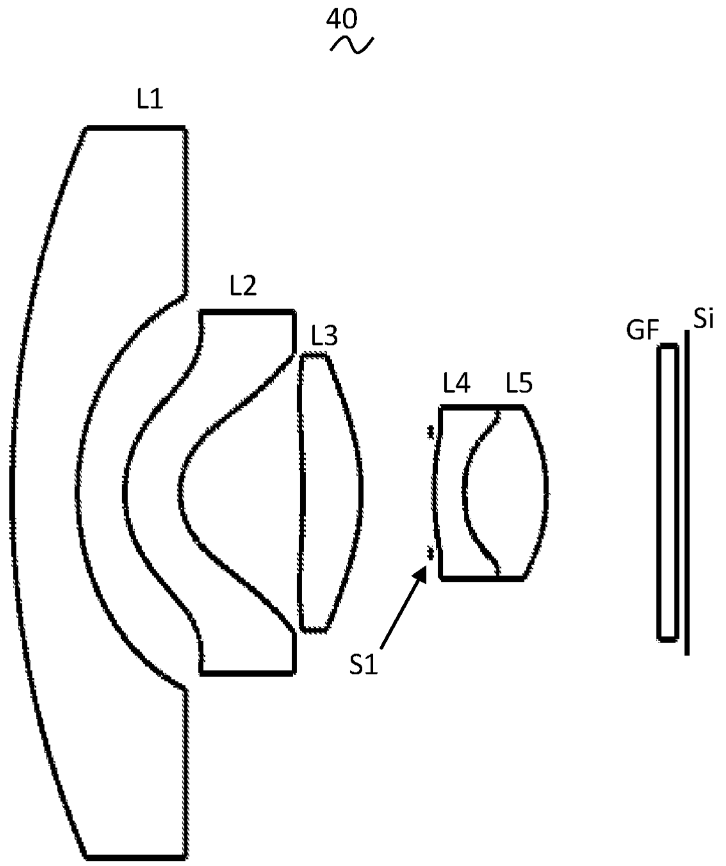
FIG. 13 is a structural schematic diagram of a camera optical lens according to a fourth embodiment of the present disclosure.

FIG. 13 shows a camera optical lens 40 according to the fourth embodiment of the present disclosure.

Table 13 and Table 14 show design data of the camera optical lens 40 according to the fourth embodiment of the present disclosure.

TABLE 13

| | R | | d | | nd | | vd |
|---|---|---|---|---|---|---|---|
| S1 | ∞ | d0= | −4.967 | | | | |
| R1 | 6.881 | d1= | 0.778 | nd1 | 1.8849 | v1 | 29.23 |
| R2 | 1.886 | d2= | 0.562 | | | | |
| R3 | 1.151 | d3= | 0.656 | nd2 | 1.5444 | v2 | 55.82 |
| R4 | 0.604 | d4= | 1.456 | | | | |
| R5 | −5.853 | d5= | 0.695 | nd3 | 1.6613 | v3 | 20.37 |
| R6 | −1.467 | d6= | 0.865 | | | | |
| R7 | 3.196 | d7= | 0.361 | nd4 | 1.6613 | v4 | 20.37 |
| R8 | 1.065 | d8= | 0.000 | | | | |
| R9 | 1.065 | d9= | 0.975 | nd5 | 1.5444 | v5 | 55.82 |
| R10 | −1.593 | d10= | 1.329 | | | | |
| R11 | ∞ | d11= | 0.210 | ndg | 1.5233 | vg | 54.52 |
| R12 | ∞ | d12= | 0.129 | | | | |

Table 14 shows aspheric surface data of each lens of the camera optical lens 40 according to the fourth embodiment of the present disclosure.

TABLE 14

| | Conic coefficient | Aspheric coefficient | | | | |
|---|---|---|---|---|---|---|
| | k | A4 | A6 | A8 | A10 | A12 |
| R3 | −1.0571E+00 | 1.8196E−01 | −2.1350E−01 | 3.9975E−01 | −5.8386E−01 | 4.2780E−01 |
| R4 | −1.5803E+00 | 8.5388E−01 | −6.3547E−01 | 8.5932E−01 | −2.8700E+00 | 4.1013E+00 |
| R5 | −1.4555E+01 | 5.6459E−02 | −6.2860E−02 | 1.8557E−01 | −2.8798E−01 | 2.2554E−01 |
| R6 | −4.4899E+00 | −1.2287E−02 | −1.0015E−02 | 7.8897E−02 | −2.0418E−01 | 2.8366E−01 |
| R7 | −1.6265E+01 | 3.1695E−01 | −2.9032E−01 | −2.8916E+00 | 2.9849E+01 | −1.6554E+02 |
| R8 | 2.6983E−03 | 1.3233E+00 | −1.3164E+00 | −2.7364E+00 | 2.1077E+01 | −1.0136E+02 |
| R9 | 2.6983E−03 | 1.3233E+00 | −1.3164E+00 | −2.7364E+00 | 2.1077E+01 | −1.0136E+02 |
| R10 | −6.4360E−01 | 6.5116E−02 | −7.8239E−01 | 5.3312E+00 | −2.2532E+01 | 6.0982E+01 |

| | Conic coefficient | Aspheric coefficient | | | |
|---|---|---|---|---|---|
| | k | A14 | A16 | A18 | A20 |
| R3 | −1.0571E+00 | −1.7345E−01 | 4.0246E−02 | −5.0340E−03 | 2.6409E−04 |
| R4 | −1.5803E+00 | −2.9438E+00 | 1.1485E+00 | −2.3268E−01 | 1.9066E−02 |
| R5 | −1.4555E+01 | −7.4130E−02 | −5.3165E−03 | 9.2480E−03 | −1.6124E−03 |
| R6 | −4.4899E+00 | −2.2563E−01 | 1.0438E−01 | −2.6509E−02 | 2.8803E−03 |
| R7 | −1.6265E+01 | 5.6280E+02 | −1.1825E+03 | 1.4219E+03 | −7.4645E+02 |
| R8 | 2.6983E−03 | 3.0838E+02 | −5.6336E+02 | 5.5450E+02 | −2.1974E+02 |
| R9 | 2.6983E−03 | 3.0838E+02 | −5.6336E+02 | 5.5450E+02 | −2.1974E+02 |
| R10 | −6.4360E−01 | −1.0938E+02 | 1.2873E+02 | −9.0263E+01 | 2.8525E+01 |

Table 15 and Table 16 show design data of inflection points and arrest points of each lens of the camera optical lens 40 according to the fourth embodiment of the present disclosure.

TABLE 15

| | The number of inflection points | Inflection point position 1 | Inflection point position 2 |
|---|---|---|---|
| P1R1 | 0 | / | / |
| P1R2 | 0 | / | / |
| P2R1 | 1 | 0.965 | / |
| P2R2 | 1 | 0.815 | / |
| P3R1 | 2 | 0.535 | 1.255 |
| P3R2 | 0 | / | / |
| P4R1 | 0 | / | / |
| P4R2 | 0 | / | / |
| P5R1 | 0 | / | / |
| P5R2 | 0 | / | / |

TABLE 16

| | The number of arrest points | Arrest point position 1 |
|---|---|---|
| P1R1 | 0 | / |
| P1R2 | 0 | / |
| P2R1 | 1 | 1.615 |
| P2R2 | 0 | / |
| P3R1 | 1 | 0.945 |
| P3R2 | 0 | / |
| P4R1 | 0 | / |
| P4R2 | 0 | / |
| P5R1 | 0 | / |
| P5R2 | 0 | / |

Figure 14:
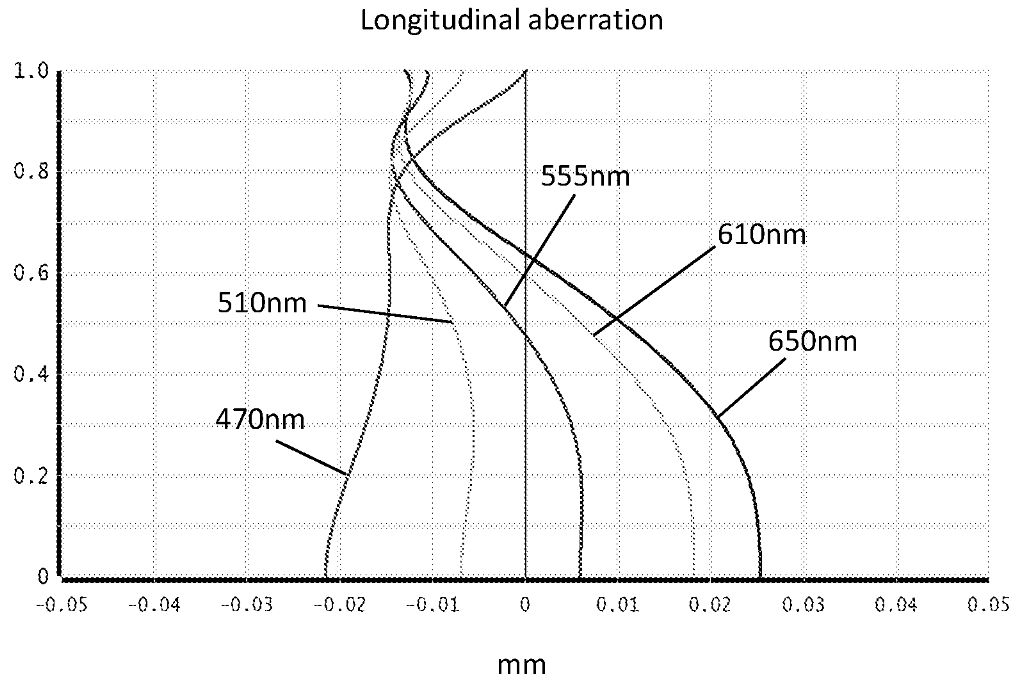
FIG. 14 is a schematic diagram of a longitudinal aberration of the camera optical lens shown in FIG. 13.
Figure 15:
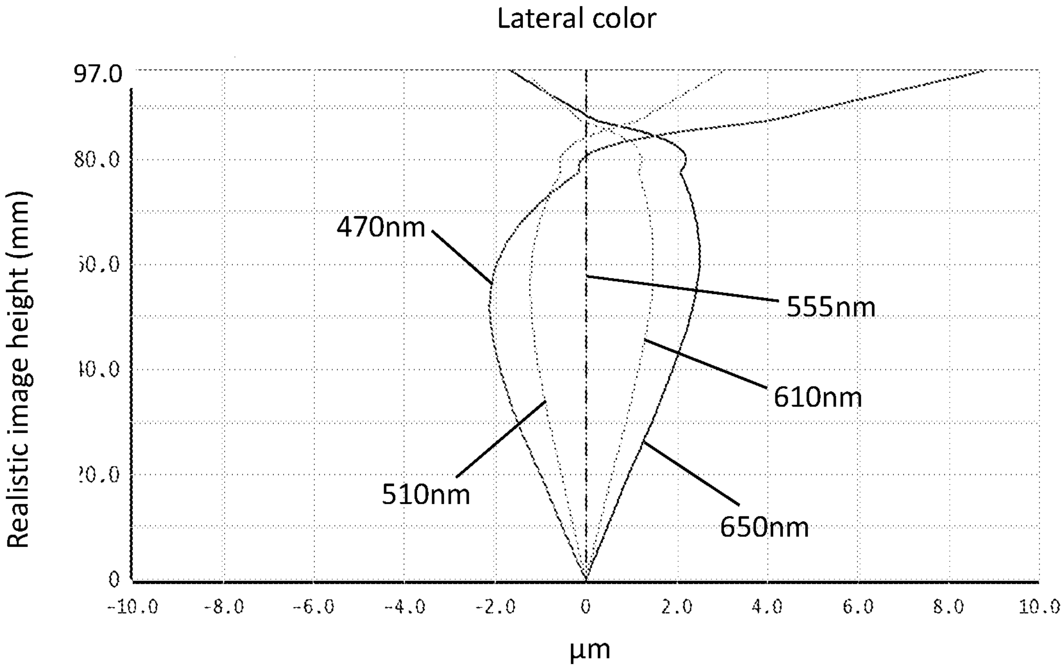
FIG. 15 is a schematic diagram of lateral color of the camera optical lens shown in FIG. 13.
Figure 16:
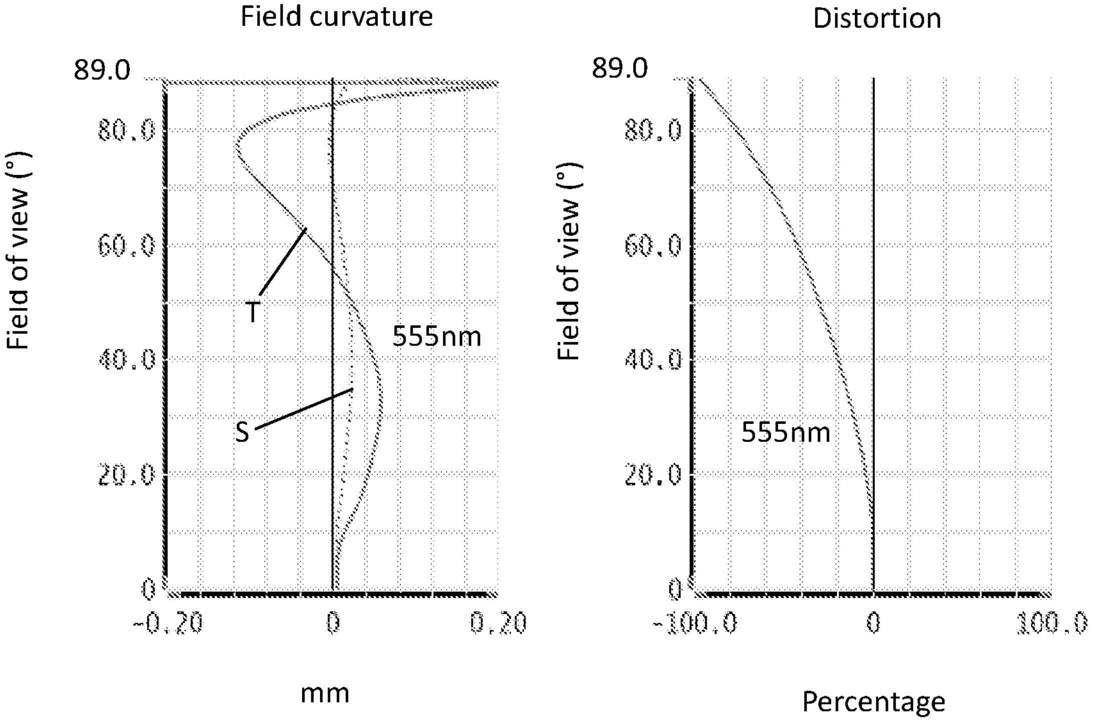
FIG. 16 is a schematic diagram of a field curvature and a distortion of the camera optical lens shown in FIG. 13.

FIG. 14 and FIG. 15 show schematic diagrams of a longitudinal aberration and a lateral color of light with wavelengths of 470 nm, 510 nm, 555 nm, 610 nm and 650 nm after passing through the camera optical lens 40 according to the fourth embodiment, respectively. FIG. 16 shows a field curvature and a distortion of light with a wavelength of 555 nm after passing through the camera optical lens 40 according to the fourth embodiment. The field curvature S in FIG. 16 is a field curvature in a sagittal direction, and the field curvature T is a field curvature in a meridian direction.

The following Table 29 lists the values corresponding to each conditional in this embodiment according to the above conditionals. It is apparent that, the camera optical lens 40 of this embodiment satisfies the above conditionals.

In this embodiment, the entrance pupil diameter ENPD of the camera optical lens 40 is 0.542 mm, the full-field image height IH is 1.613 mm, and the field of view FOV in the diagonal direction is 194.00°. The camera optical lens 40 meets the design requirements of large aperture, ultra-thin, and ultra-wide-angle, and has excellent optical characteristics.

Fifth Embodiment

The fifth embodiment is substantially the same as the first embodiment, and the meanings of reference signs are the same as those of the first embodiment. Only differences are listed below.

Figure 17:
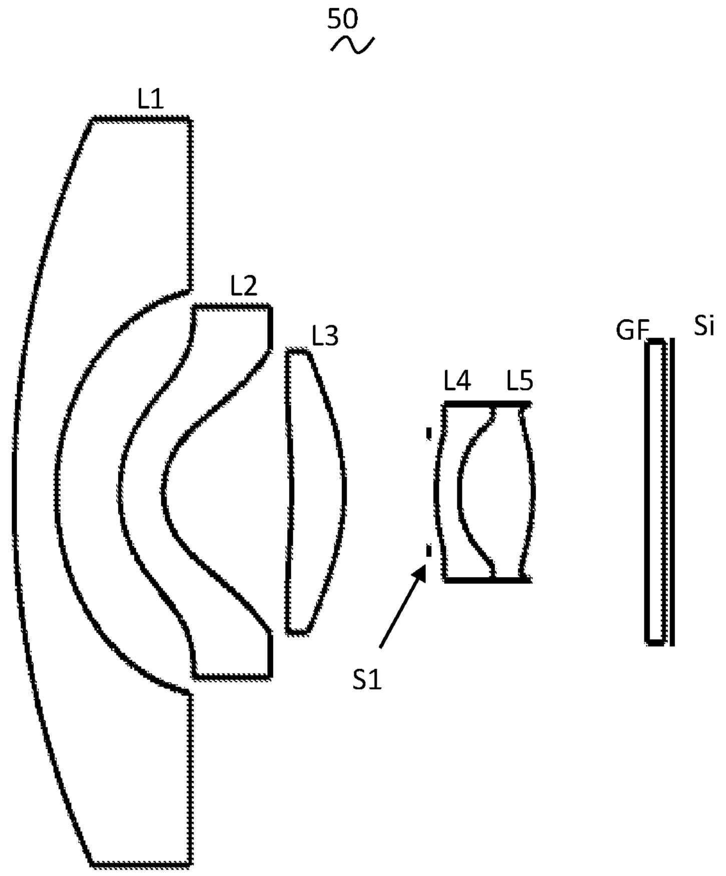
FIG. 17 is a structural schematic diagram of a camera optical lens according to a fifth embodiment of the present disclosure.

FIG. 17 shows a camera optical lens 50 according to the fifth embodiment of the present disclosure.

Table 17 and Table 18 show design data of the camera optical lens 50 according to the fifth embodiment of the present disclosure.

TABLE 17

| | R | | d | | nd | | vd |
|---|---|---|---|---|---|---|---|
| S1 | ∞ | d0= | −4.979 | | | | |
| R1 | 7.377 | d1= | 0.508 | nd1 | 2.0990 | v1 | 46.93 |
| R2 | 1.982 | d2= | 0.761 | | | | |
| R3 | 1.116 | d3= | 0.522 | nd2 | 1.5444 | v2 | 55.82 |
| R4 | 0.628 | d4= | 1.538 | | | | |
| R5 | −4.947 | d5= | 0.631 | nd3 | 1.6613 | v3 | 20.37 |
| R6 | −1.609 | d6= | 1.105 | | | | |
| R7 | 2.717 | d7= | 0.273 | nd4 | 1.6613 | v4 | 20.37 |
| R8 | 1.161 | d8= | 0.000 | | | | |
| R9 | 1.161 | d9= | 0.887 | nd5 | 1.5444 | v5 | 55.82 |
| R10 | −1.249 | d10= | 1.364 | | | | |
| R11 | ∞ | d11= | 0.210 | ndg | 1.5233 | vg | 54.52 |
| R12 | ∞ | d12= | 0.099 | | | | |

Table 18 shows aspheric surface data of each lens of the camera optical lens 50 according to the fifth embodiment of the present disclosure.

TABLE 18

| | Conic coefficient | Aspheric coefficient | | | | |
|---|---|---|---|---|---|---|
| | k | A4 | A6 | A8 | A10 | A12 |
| R3 | −1.0130E+00 | 1.8852E−01 | −2.1381E−01 | 4.0057E−01 | −5.8382E−01 | 4.2781E−01 |
| R4 | −1.8028E+00 | 8.6403E−01 | −6.3595E−01 | 8.5876E−01 | −2.8703E+00 | 4.1012E+00 |
| R5 | 9.8431E−01 | 6.7896E−02 | −6.6537E−02 | 1.8589E−01 | −2.8816E−01 | 2.2562E−01 |
| R6 | −3.6625E+00 | −8.4075E−03 | −9.0255E−03 | 7.8329E−02 | −2.0426E−01 | 2.8346E−01 |
| R7 | 1.4600E+01 | 1.3116E+00 | −9.4997E+00 | 2.4593E+01 | 1.8624E+01 | −2.3450E+02 |
| R8 | −4.9094E+01 | 5.6642E+00 | −3.1548E+01 | 9.8997E+01 | −1.1887E+02 | −1.3403E+02 |
| R9 | −4.9094E+01 | 5.6642E+00 | −3.1548E+01 | 9.8997E+01 | −1.1887E+02 | −1.3403E+02 |
| R10 | −1.0933E+02 | −1.6380E+00 | 7.2278E+00 | −1.3155E+01 | −8.8924E+00 | 7.5213E+01 |

| | Conic coefficient | Aspheric coefficient | | | |
|---|---|---|---|---|---|
| | k | A14 | A16 | A18 | A20 |
| R3 | −1.0130E+00 | −1.7347E−01 | 4.0246E−02 | −5.0338E−03 | 2.6396E−04 |
| R4 | −1.8028E+00 | −2.9438E+00 | 1.1485E+00 | −2.3268E−01 | 1.9068E−02 |
| R5 | 9.8431E−01 | −7.4269E−02 | −5.3423E−03 | 9.2451E−03 | −1.6094E−03 |
| R6 | −3.6625E+00 | −2.2566E−01 | 1.0440E−01 | −2.6515E−02 | 2.8845E−03 |
| R7 | 1.4600E+01 | 5.3628E+02 | −9.2129E+02 | 1.6141E+03 | −1.4237E+03 |
| R8 | −4.9094E+01 | 5.7326E+02 | −5.6020E+02 | −1.2911E+01 | 2.0732E+02 |
| R9 | −4.9094E+01 | 5.7326E+02 | −5.6020E+02 | −1.2911E+01 | 2.0732E+02 |
| R10 | −1.0933E+02 | −1.0431E+02 | 4.1399E+01 | −7.9098E+00 | 2.2900E+01 |

Table 19 and Table 20 show design data of inflection points and arrest points of each lens of the camera optical lens 50 according to the fifth embodiment of the present disclosure.

TABLE 19

| | The number of inflection points | Inflection point position 1 | Inflection point position 2 |
|---|---|---|---|
| P1R1 | 0 | / | / |
| P1R2 | 0 | / | / |
| P2R1 | 1 | 0.975 | / |
| P2R2 | 1 | 0.815 | / |
| P3R1 | 2 | 0.565 | 1.175 |
| P3R2 | 0 | / | / |
| P4R1 | 0 | / | / |
| P4R2 | 1 | 0.645 | / |
| P5R1 | 0 | / | / |
| P5R2 | 0 | / | / |

TABLE 20

| | The number of arrest points | Arrest point position 1 | Arrest point position 2 |
|---|---|---|---|
| P1R1 | 0 | / | / |
| P1R2 | 0 | / | / |
| P2R1 | 1 | 1.705 | / |
| P2R2 | 0 | / | / |
| P3R1 | 2 | 1.065 | 1.245 |
| P3R2 | 0 | / | / |
| P4R1 | 0 | / | / |
| P4R2 | 0 | / | / |
| P5R1 | 0 | / | / |
| P5R2 | 0 | / | / |

Figure 18:
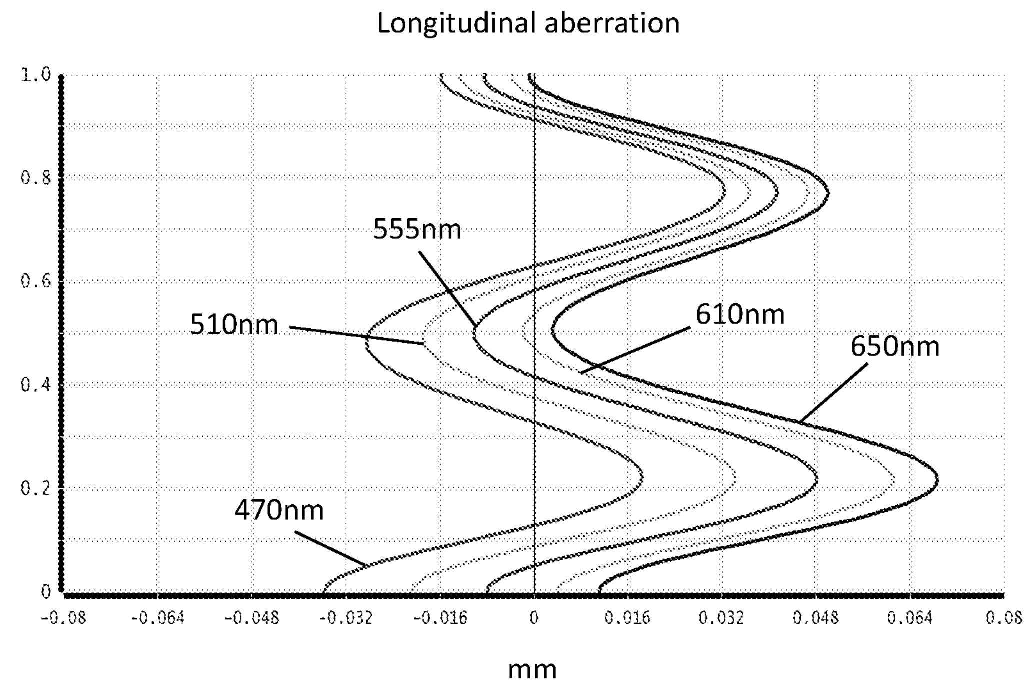
FIG. 18 is a schematic diagram of a longitudinal aberration of the camera optical lens shown in FIG. 17.
Figure 19:
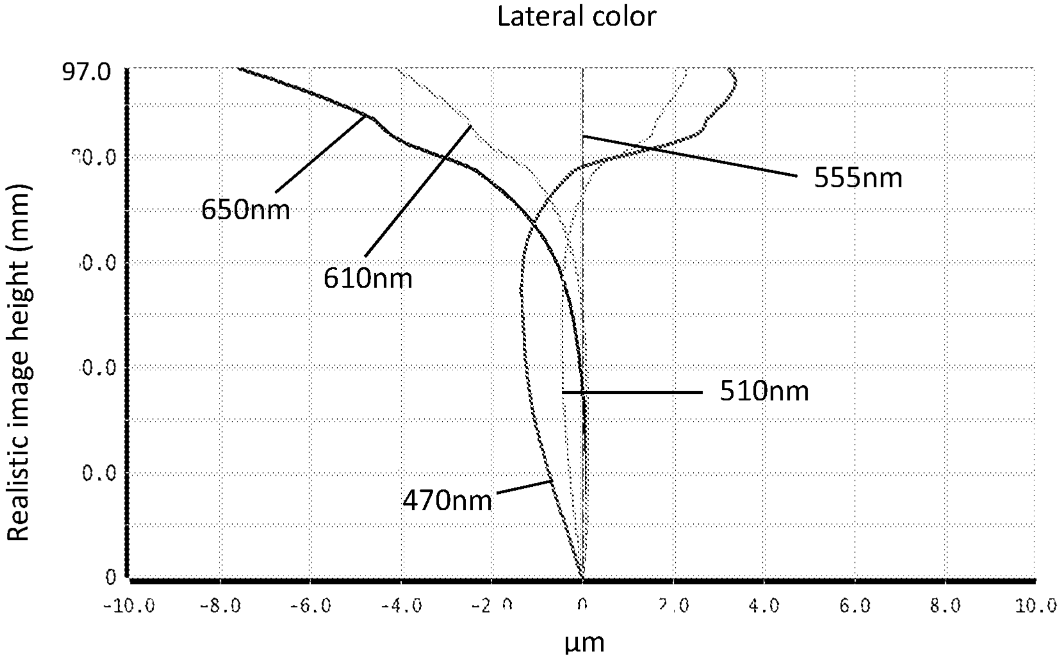
FIG. 19 is a schematic diagram of lateral color of the camera optical lens shown in FIG. 17.
Figure 20:
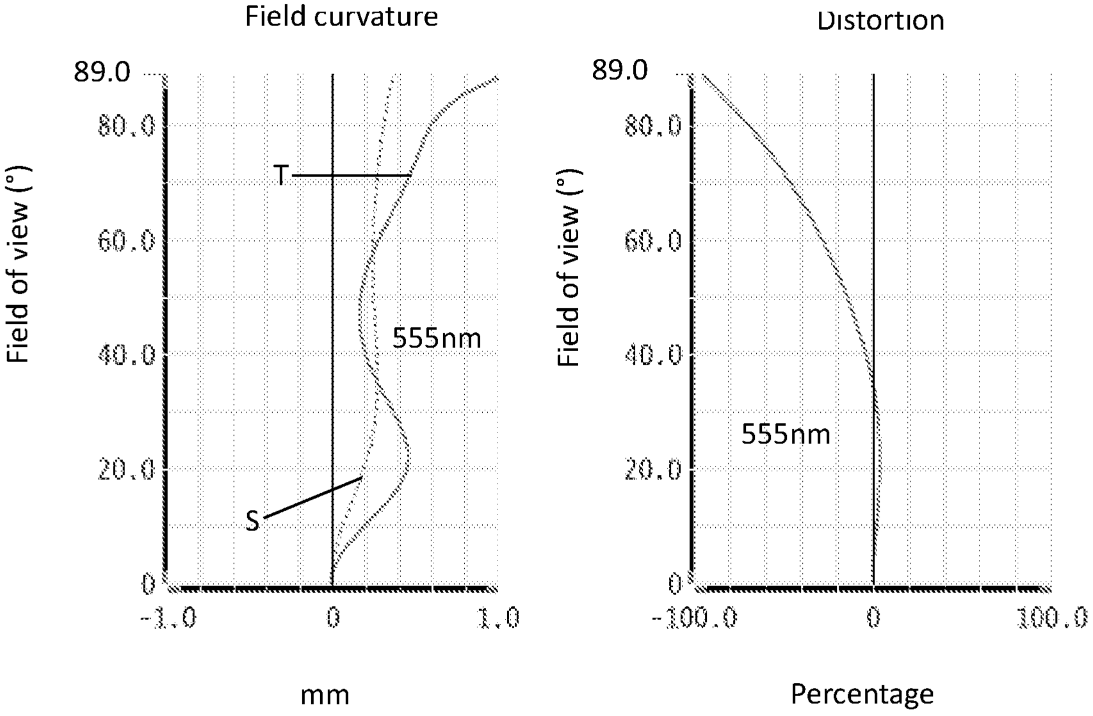
FIG. 20 is a schematic diagram of a field curvature and a distortion of the camera optical lens shown in FIG. 17.

FIG. 18 and FIG. 19 show schematic diagrams of a longitudinal aberration and a lateral color of light with wavelengths of 470 nm, 510 nm, 555 nm, 610 nm and 650 nm after passing through the camera optical lens 50 according to the fifth embodiment, respectively. FIG. 20 shows a field curvature and a distortion of light with a wavelength of 555 nm after passing through the camera optical lens 50 according to the fifth embodiment. The field curvature S in FIG. 20 is a field curvature in a sagittal direction, and the field curvature T is a field curvature in a meridian direction.

The following Table 29 lists the values corresponding to each conditional in this embodiment according to the above conditionals. It is apparent that, the camera optical lens 50 of this embodiment satisfies the above conditionals.

In this embodiment, the entrance pupil diameter ENPD of the camera optical lens 50 is 0.369 mm, the full-field image height IH is 1.460 mm, and the field of view FOV in the diagonal direction is 194.00°. The camera optical lens 50 meets the design requirements of large aperture, ultra-thin, and ultra-wide-angle, and has excellent optical characteristics.

Sixth Embodiment

The sixth embodiment is substantially the same as the first embodiment, and the meanings of reference signs are the same as those of the first embodiment. Only differences are listed below.

Figure 21:
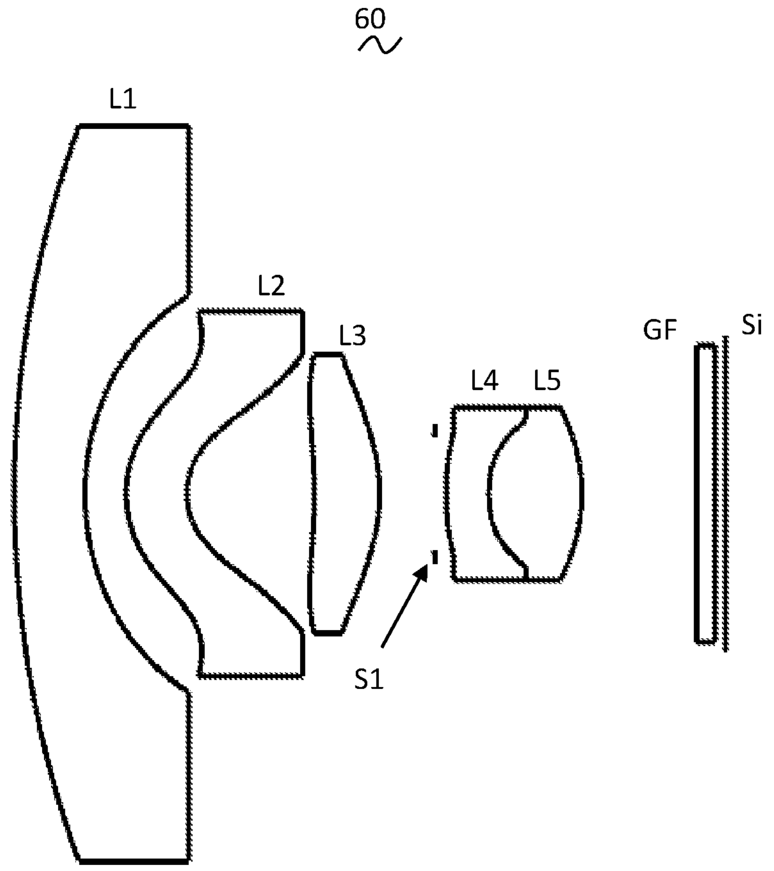
FIG. 21 is a structural schematic diagram of a camera optical lens according to a sixth embodiment of the present disclosure.

FIG. 21 shows a camera optical lens 60 according to the sixth embodiment of the present disclosure.

Table 21 and Table 22 show design data of the camera optical lens 60 according to the sixth embodiment of the present disclosure.

TABLE 21

| | R | d | | nd | | νd | |
|---|---|---|---|---|---|---|---|
| S1 | ∞ | d0= | −4.955 | | | | |
| R1 | 9.298 | d1= | 0.798 | nd1 | 1.8950 | ν1 | 33.83 |
| R2 | 2.200 | d2= | 0.466 | | | | |
| R3 | 1.019 | d3= | 0.685 | nd2 | 1.5444 | ν2 | 55.82 |
| R4 | 0.619 | d4= | 1.440 | | | | |
| R5 | −4.400 | d5= | 0.743 | nd3 | 1.6613 | ν3 | 20.37 |
| R6 | −1.451 | d6= | 0.752 | | | | |
| R7 | 3.100 | d7= | 0.479 | nd4 | 1.6613 | ν4 | 20.37 |
| R8 | 1.167 | d8= | 0.000 | | | | |
| R9 | 1.167 | d9= | 1.053 | nd5 | 1.5444 | ν5 | 55.82 |
| R10 | −1.400 | d10= | 1.293 | | | | |
| R11 | ∞ | d11= | 0.210 | ndg | 1.5233 | νg | 54.52 |
| R12 | ∞ | d12= | 0.119 | | | | |

Table 22 shows aspheric surface data of each lens of the camera optical lens 60 according to the sixth embodiment of the present disclosure.

TABLE 22

| | Conic coefficient | Aspheric coefficient | | | | |
|---|---|---|---|---|---|---|
| | k | A4 | A6 | A8 | A10 | A12 |
| R3 | −1.0661E+00 | 1.7594E−01 | −2.1299E−01 | 3.9976E−01 | −5.8386E−01 | 4.2780E−01 |
| R4 | −1.6301E+00 | 8.5295E−01 | −6.3563E−01 | 8.5861E−01 | −2.8702E+00 | 4.1012E+00 |
| R5 | −1.0174E+01 | 6.5055E−02 | −6.3591E−02 | 1.8574E−01 | −2.8795E−01 | 2.2571E−01 |
| R6 | −4.3138E+00 | −1.2718E−02 | −8.5906E−03 | 7.8832E−02 | −2.0409E−01 | 2.8369E−01 |
| R7 | −1.0038E+01 | 3.2471E−01 | −8.2778E−02 | −4.8041E+00 | 3.7103E+01 | −1.7450E+02 |
| R8 | −1.2002E+00 | 9.7354E−01 | 5.3566E−01 | −4.4700E+00 | 1.9444E+01 | −9.8074E+01 |
| R9 | −1.2002E+00 | 9.7354E−01 | 5.3566E−01 | −4.4700E+00 | 1.9444E+01 | −9.8074E+01 |
| R10 | −5.4230E+00 | −3.6181E−02 | −9.5346E−01 | 5.1921E+00 | −1.9812E+01 | 5.7331E+01 |

| | Conic coefficient | Aspheric coefficient | | | |
|---|---|---|---|---|---|
| | k | A14 | A16 | A18 | A20 |
| R3 | −1.0661E+00 | −1.7345E−01 | 4.0246E−02 | −5.0340E−03 | 2.6407E−04 |
| R4 | −1.6301E+00 | −2.9438E+00 | 1.1485E+00 | −2.3269E−01 | 1.9068E−02 |
| R5 | −1.0174E+01 | −7.4133E−02 | −5.3100E−03 | 9.2563E−03 | −1.6142E−03 |
| R6 | −4.3138E+00 | −2.2561E−01 | 1.0441E−01 | −2.6492E−02 | 2.8864E−03 |
| R7 | −1.0038E+01 | 5.6064E+02 | −1.1705E+03 | 1.4305E+03 | −8.0034E+02 |
| R8 | −1.2002E+00 | 3.1089E+02 | −5.6309E+02 | 5.3152E+02 | −1.9188E+02 |

TABLE 22-continued

| | | | | | |
|---|---|---|---|---|---|
| R9 | −1.2002E+00 | 3.1089E+02 | −5.6309E+02 | 5.3152E+02 | −1.9188E+02 |
| R10 | −5.4230E+00 | −1.1211E+02 | 1.3244E+02 | −8.3004E+01 | 2.0704E+01 |

Table 23 and Table 24 show design data of inflection points and arrest points of each lens of the camera optical lens 60 according to the sixth embodiment of the present disclosure.

TABLE 23

| | The number of inflection points | Inflection point position 1 |
|---|---|---|
| P1R1 | 0 | / |
| P1R2 | 0 | / |
| P2R1 | 1 | 0.955 |
| P2R2 | 1 | 0.815 |
| P3R1 | 1 | 0.545 |
| P3R2 | 1 | 1.095 |
| P4R1 | 0 | / |
| P4R2 | 0 | / |
| P5R1 | 0 | / |
| P5R2 | 0 | / |

TABLE 24

| | The number of arrest points | Arrest point position 1 |
|---|---|---|
| P1R1 | 0 | / |
| P1R2 | 0 | / |
| P2R1 | 1 | 1.545 |
| P2R2 | 0 | / |
| P3R1 | 1 | 0.955 |
| P3R2 | 0 | / |
| P4R1 | 0 | / |
| P4R2 | 0 | / |
| P5R1 | 0 | / |
| P5R2 | 0 | / |

Figure 22:
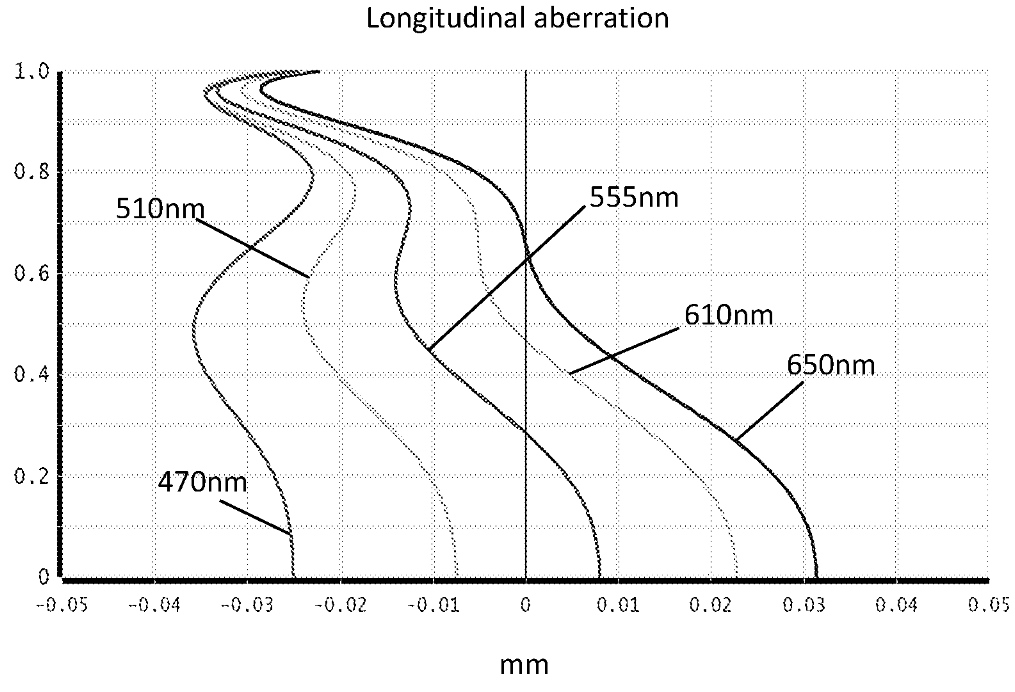
FIG. 22 is a schematic diagram of a longitudinal aberration of the camera optical lens shown in FIG. 21.
Figure 23:
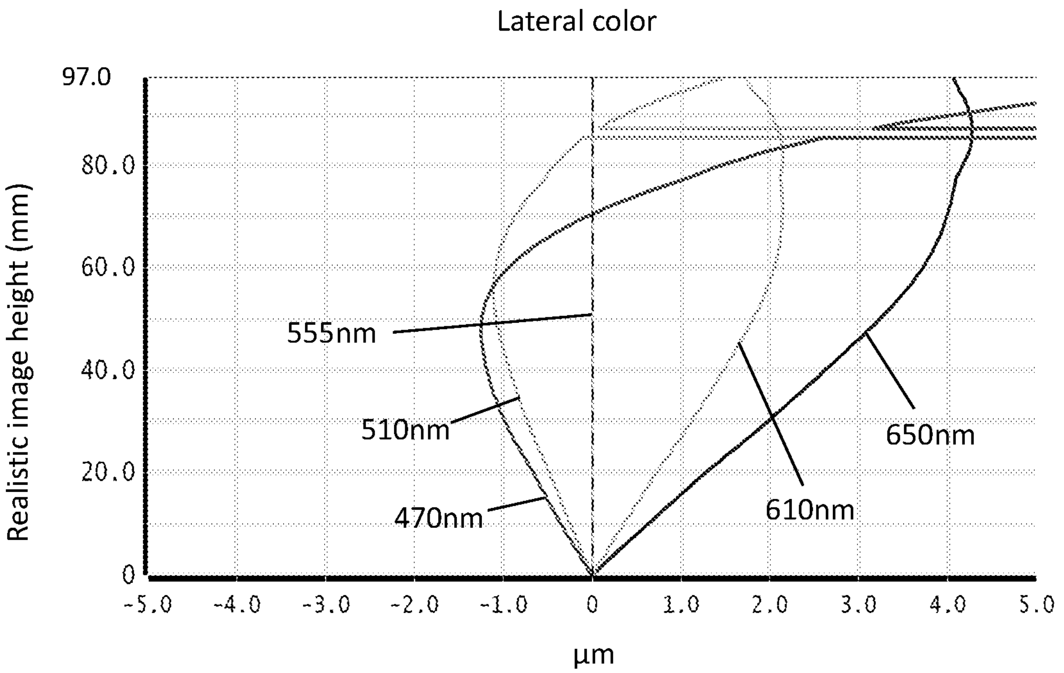
FIG. 23 is a schematic diagram of lateral color of the camera optical lens shown in FIG. 21.
Figure 24:
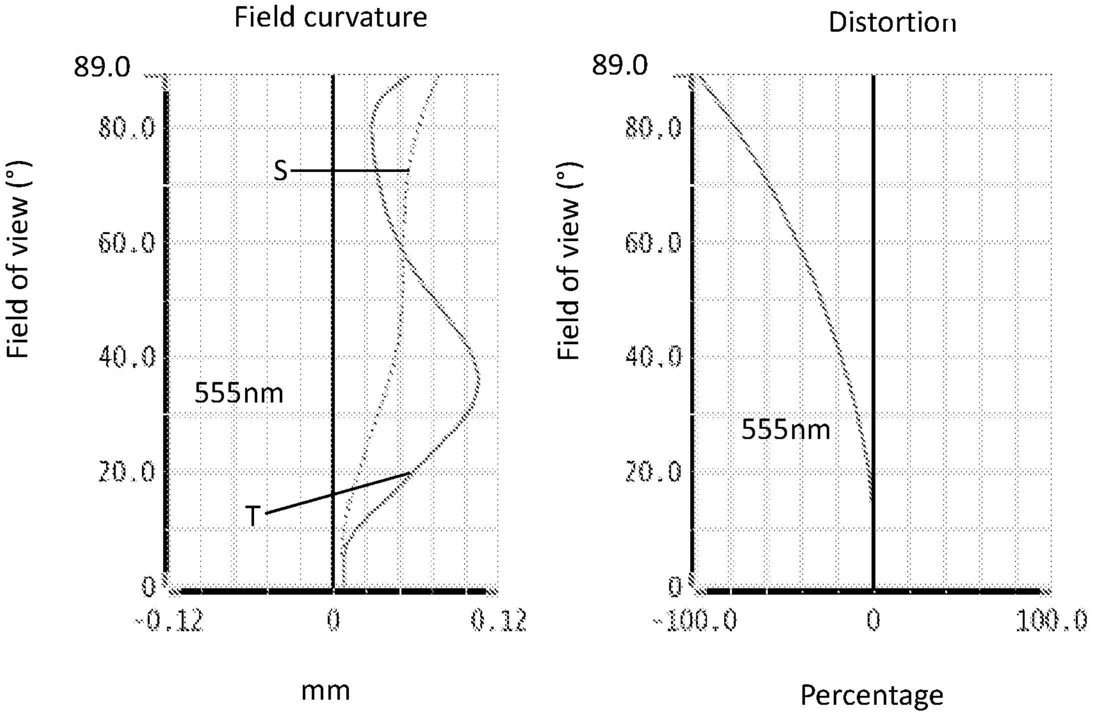
FIG. 24 is a schematic diagram of a field curvature and a distortion of the camera optical lens shown in FIG. 21.

FIG. 22 and FIG. 23 show schematic diagrams of a longitudinal aberration and a lateral color of light with wavelengths of 470 nm, 510 nm, 555 nm, 610 nm and 650 nm after passing through the camera optical lens 60 according to the sixth embodiment, respectively. FIG. 24 shows a field curvature and a distortion of light with a wavelength of 555 nm after passing through the camera optical lens 60 according to the sixth embodiment. The field curvature S in FIG. 24 is a field curvature in a sagittal direction, and the field curvature Tis a field curvature in a meridian direction.

The following Table 29 lists the values corresponding to each conditional in this embodiment according to the above conditionals. It is apparent that, the camera optical lens 60 of this embodiment satisfies the above conditionals.

In this embodiment, the entrance pupil diameter ENPD of the camera optical lens 60 is 0.546 mm, the full-field image height IH is 1.472 mm, and the field of view FOV in the diagonal direction is 194.00°. The camera optical lens 60 meets the design requirements of large aperture, ultra-thin, and ultra-wide-angle, and has excellent optical characteristics.

Comparative Embodiment

The meanings of reference signs of the comparative embodiment are the same as those of the first embodiment. Only differences are listed below.

Figure 25:
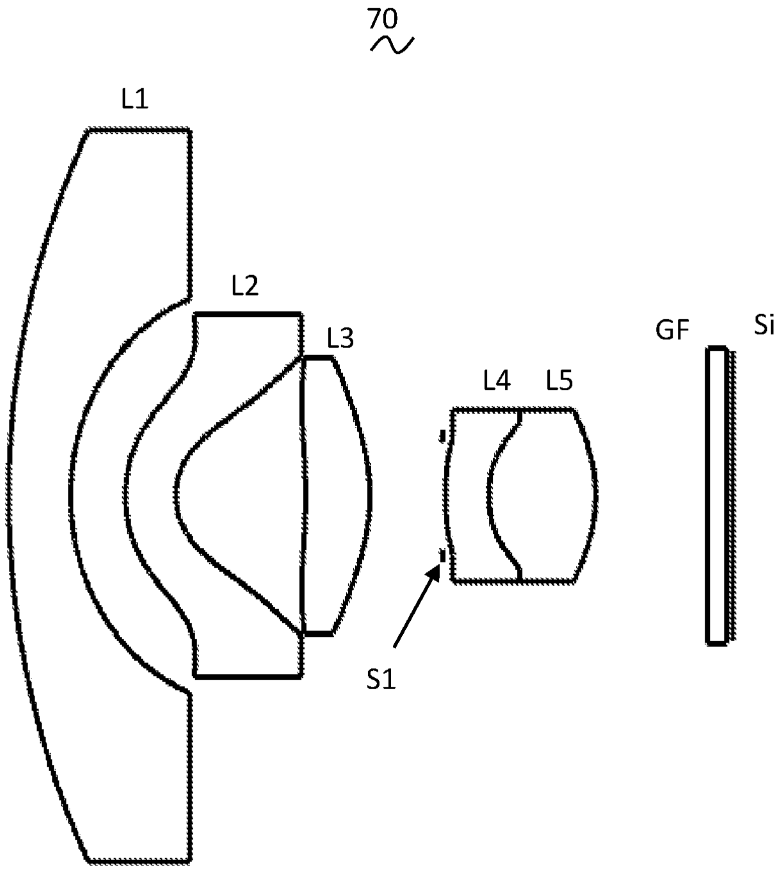
FIG. 25 is a structural schematic diagram of a camera optical lens according to a comparative embodiment.

FIG. 25 shows a camera optical lens 70 according to the comparative embodiment.

Table 25 and Table 26 show design data of the camera optical lens 70 according to the comparative embodiment.

TABLE 25

| | R | | d | | nd | | vd |
|---|---|---|---|---|---|---|---|
| S1 | ∞ | d0= | −4.853 | | | | |
| R1 | 7.758 | d1= | 0.691 | nd1 | 1.9108 | v1 | 35.25 |
| R2 | 2.084 | d2= | 0.614 | | | | |
| R3 | 1.218 | d3= | 0.562 | nd2 | 1.5444 | v2 | 55.82 |
| R4 | 0.609 | d4= | 1.449 | | | | |
| R5 | −5.305 | d5= | 0.724 | nd3 | 1.6613 | v3 | 20.37 |
| R6 | −1.618 | d6= | 0.842 | | | | |
| R7 | 2.295 | d7= | 0.487 | nd4 | 1.6613 | v4 | 20.37 |
| R8 | 1.131 | d8= | 0.000 | | | | |
| R9 | 1.131 | d9= | 1.195 | nd5 | 1.5444 | v5 | 55.82 |
| R10 | −1.296 | d10= | 1.252 | | | | |
| R11 | ∞ | d11= | 0.210 | ndg | 1.5233 | vg | 54.52 |
| R12 | ∞ | d12= | 0.070 | | | | |

Table 26 shows aspheric surface data of each lens of the camera optical lens 70 according to the comparative embodiment.

TABLE 26

| | Conic coefficient | Aspheric coefficient | | | | |
|---|---|---|---|---|---|---|
| | k | A4 | A6 | A8 | A10 | A12 |
| R3 | 0.0000E+00 | 1.8687E−01 | −2.1222E−01 | 3.9986E−01 | −5.8388E−01 | 4.2778E−01 |
| R4 | −1.2133E+01 | 8.5136E−01 | −6.4197E−01 | 8.5734E−01 | −2.8695E+00 | 4.1020E+00 |
| R5 | −4.6469E+00 | 5.8533E−02 | −6.0895E−02 | 1.8531E−01 | −2.8865E−01 | 2.2521E−01 |
| R6 | 0.0000E+00 | −9.1033E−03 | −9.3306E−03 | 7.8623E−02 | −2.0490E−01 | 2.8350E−01 |
| R7 | −1.8562E+01 | 3.1656E−01 | 5.5780E−02 | −5.1514E+00 | 3.6707E+01 | −1.7471E+02 |
| R8 | −7.4402E−01 | 1.1797E+00 | −1.4711E+00 | −3.3188E+00 | 2.1674E+01 | −9.7552E+01 |
| R9 | −7.4402E−01 | 1.1797E+00 | −1.4711E+00 | −3.3188E+00 | 2.1674E+01 | −9.7552E+01 |
| R10 | −1.5645E+00 | 7.7728E−02 | −6.0431E−01 | 4.6154E+00 | −2.0978E+01 | 5.9905E+01 |

| | Conic coefficient | Aspheric coefficient | | | |
|---|---|---|---|---|---|
| | k | A14 | A16 | A18 | A20 |
| R3 | 0.0000E+00 | −1.7346E−01 | 4.0245E−02 | −5.0341E−03 | 2.6420E−04 |
| R4 | −1.2133E+01 | −2.9434E+00 | 1.1486E+00 | −2.3268E−01 | 1.9037E−02 |
| R5 | −4.6469E+00 | −7.4227E−02 | −5.2654E−03 | 9.2917E−03 | −1.5989E−03 |

TABLE 26-continued

| | | | | | |
|---|---|---|---|---|---|
| R6 | 0.0000E+00 | −2.2568E−01 | 1.0436E−01 | −2.6492E−02 | 2.8927E−03 |
| R7 | −1.8562E+01 | 5.5934E+02 | −1.1730E+03 | 1.4298E+03 | −7.3804E+02 |
| R8 | −7.4402E−01 | 3.0882E+02 | −5.6748E+02 | 5.4660E+02 | −2.2122E+02 |
| R9 | −7.4402E−01 | 3.0882E+02 | −5.6748E+02 | 5.4660E+02 | −2.2122E+02 |
| R10 | −1.5645E+00 | −1.1068E+02 | 1.2949E+02 | −8.7952E+01 | 2.6634E+01 |

Table 27 and Table 28 show design data of inflection points and arrest points of each lens of the camera optical lens 70 according to the comparative embodiment.

TABLE 27

| | The number of inflection points | Inflection point position 1 | Inflection point position 2 |
|---|---|---|---|
| P1R1 | 0 | / | / |
| P1R2 | 0 | / | / |
| P2R1 | 1 | 0.965 | / |
| P2R2 | 2 | 0.815 | 1.215 |
| P3R1 | 1 | 0.525 | / |
| P3R2 | 0 | / | / |
| P4R1 | 0 | / | / |
| P4R2 | 1 | 0.655 | / |
| P5R1 | 1 | 0.655 | / |
| P5R2 | 0 | / | / |

TABLE 28

| | The number of arrest points | Arrest point position 1 |
|---|---|---|
| P1R1 | 0 | / |
| P1R2 | 0 | / |
| P2R1 | 1 | 1.585 |
| P2R2 | 0 | / |
| P3R1 | 1 | 0.945 |
| P3R2 | 0 | / |
| P4R1 | 0 | / |
| P4R2 | 0 | / |
| P5R1 | 0 | / |
| P5R2 | 0 | / |

Figure 26:
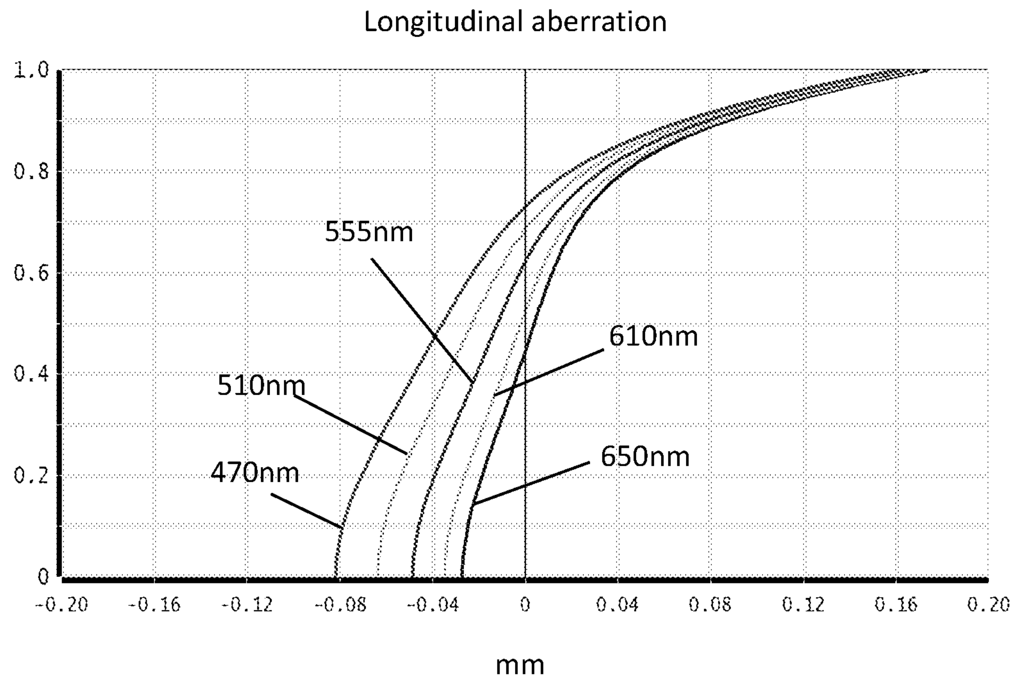
FIG. 26 is a schematic diagram of a longitudinal aberration of the camera optical lens shown in FIG. 25.
Figure 27:
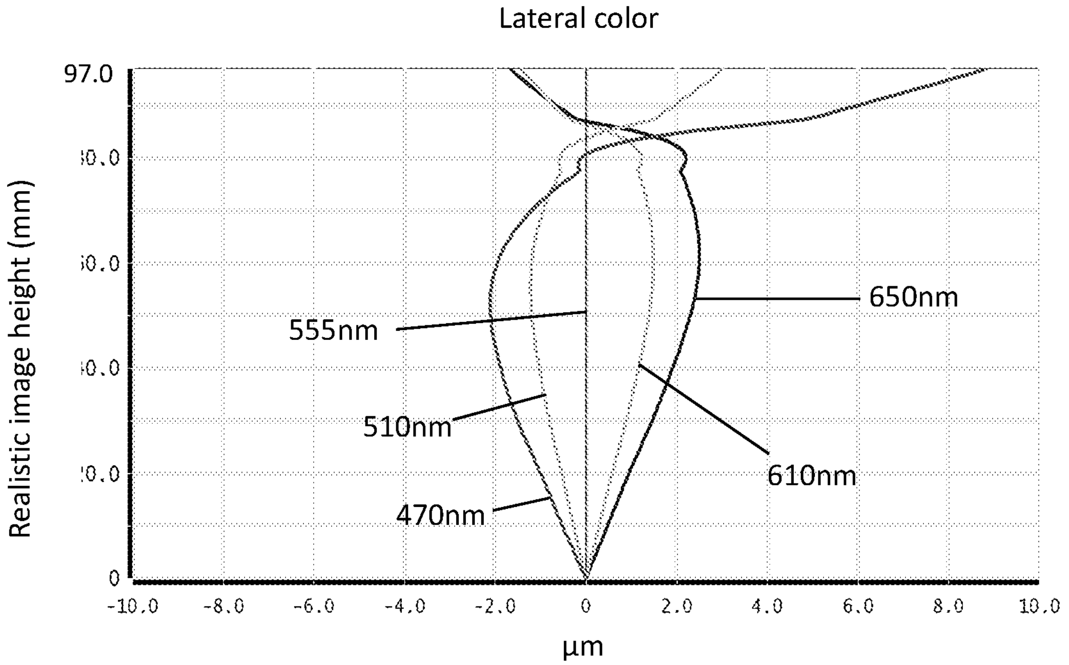
FIG. 27 is a schematic diagram of lateral color of the camera optical lens shown in FIG. 25.
Figure 28:
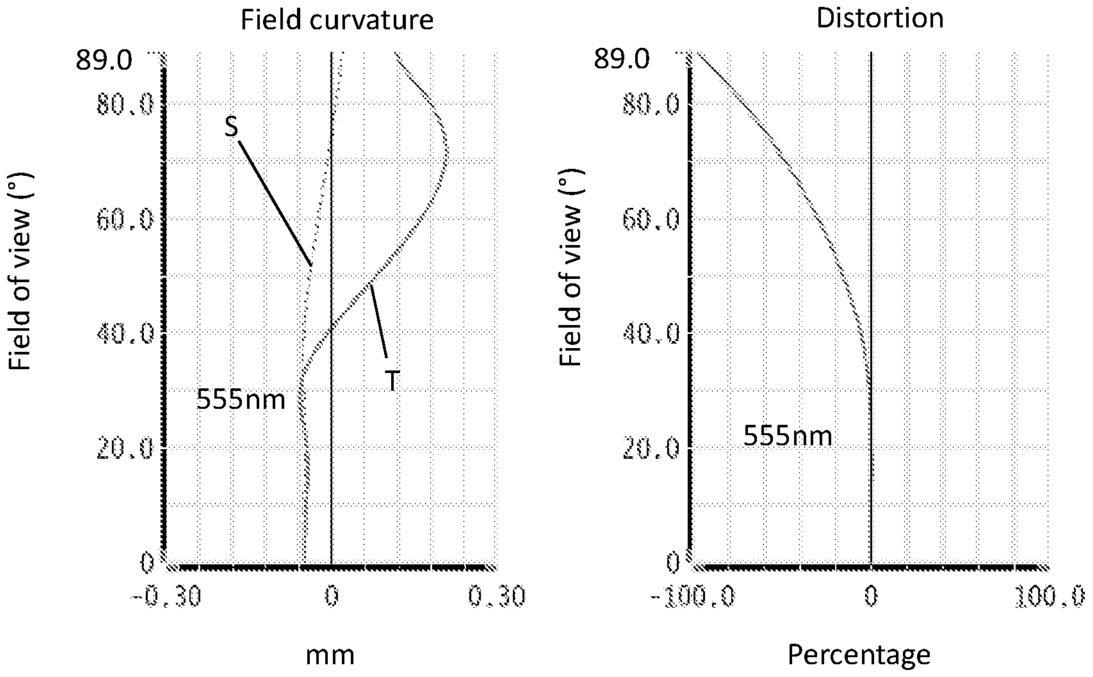
FIG. 28 is a schematic diagram of a field curvature and a distortion of the camera optical lens shown in FIG. 25.

FIG. 26 and FIG. 27 show schematic diagrams of a longitudinal aberration and a lateral color of light with wavelengths of 470 nm, 510 nm, 555 nm, 610 nm and 650 nm after passing through the camera optical lens 70 according to the comparative embodiment, respectively. FIG. 28 shows a field curvature and a distortion of light with a wavelength of 555 nm after passing through the camera optical lens 70 according to the comparative embodiment. The field curvature S in FIG. 28 is a field curvature in a sagittal direction, and the field curvature T is a field curvature in a meridian direction.

The following Table 29 lists the values corresponding to each conditional in the comparative embodiment according to the above conditionals. For the camera optical lens 70 of the comparative embodiment, (R3+R4)/(R3−R4)=3.00, which does not satisfy the relation 3.20≤(R3+R4)/(R3−R4)≤4.70.

In the comparative embodiment, the entrance pupil diameter ENPD of the camera optical lens 70 is 0.414 mm, the full-field image height IH is 1.480 mm, and the field of view FOV in the diagonal direction is 194.00°. The on-axis and off-axis color aberrations of the camera optical lens 70 have not been fully corrected.

TABLE 29

| Parameter and conditional | Embodiment 1 | Embodiment 2 | Embodiment 3 | Embodiment 4 | Embodiment 5 | Embodiment 6 | Comparative embodiment |
|---|---|---|---|---|---|---|---|
| n1 | 1.91 | 1.70 | 2.04 | 1.88 | 2.10 | 1.89 | 1.91 |
| (R3 + R4)/(R3 − R4) | 3.77 | 4.66 | 3.21 | 4.36 | 3.57 | 4.10 | 3.00 |
| f3/f | 3.85 | 3.37 | 4.22 | 3.39 | 5.00 | 3.00 | 4.34 |
| (d7 + d9)/d6 | 1.79 | 2.47 | 2.50 | 1.54 | 1.05 | 2.04 | 2.00 |
| f45/f | 2.51 | 2.26 | 3.92 | 2.11 | 2.84 | 2.25 | 2.60 |
| TTL/f | 9.61 | 8.06 | 11.95 | 8.08 | 11.73 | 8.18 | 10.87 |
| f | 0.833 | 0.986 | 0.642 | 0.975 | 0.665 | 0.982 | 0.745 |
| f1 | −3.207 | −3.841 | −2.509 | −3.481 | −2.585 | −3.384 | −3.304 |
| f2 | −4.933 | −10.183 | −2.780 | −8.113 | −4.228 | −7.302 | −3.309 |
| f3 | 3.210 | 3.327 | 2.704 | 3.302 | 3.325 | 2.948 | 3.235 |
| f4 | −3.336 | −2.706 | −2.656 | −3.346 | −3.267 | −3.114 | −4.015 |
| f5 | 1.357 | 1.299 | 1.370 | 1.341 | 1.266 | 1.363 | 1.339 |
| FNO | 1.80 | 1.80 | 1.80 | 1.80 | 1.80 | 1.80 | 1.80 |
| TTL | 8.002 | 7.943 | 7.670 | 8.016 | 7.898 | 8.037 | 8.096 |
| IH | 1.382 | 1.382 | 1.382 | 1.613 | 1.460 | 1.472 | 1.480 |
| FOV | 194.00 | 194.00 | 194.00 | 194.00 | 194.00 | 194.00 | 194.00 |

Those skilled in the art can understand that the above embodiments are specific embodiments for implementing the present disclosure, and in practical applications, various changes may be made in form and detail without departing from the spirit and scope of the present disclosure.

What is claimed is:

1. A camera optical lens, comprising from an object side to an image side:

a first lens having negative refractive power, a second lens having negative refractive power, a third lens having positive refractive power, a fourth lens having negative refractive power, and a fifth lens having positive refractive power; the first lens is made of glass material;

wherein a refractive index of the first lens is n1, a central curvature radius of an object-side surface of the second lens is R3, a central curvature radius of an image-side surface of the second lens is R4, a focal length of the third lens is f3, a focal length of the camera optical lens is f, a combined focal length of the fourth lens and the fifth lens is f45, and following relations are satisfied:

$$1.70 \leq n1 \leq 2.10;$$

$$3.20 \leq (R3+R4)/(R3-R4) \leq 4.70;$$

$$3.00 \leq f3/f \leq 5.00; \text{ and}$$

$$2.10 \leq f45/f \leq 4.00.$$

2. The camera optical lens as described in claim 1, wherein an on-axis thickness of the fourth lens is d7, an on-axis thickness of the fifth lens is d9, an on-axis distance from an image-side surface of the third lens to an object-side surface of the fourth lens is d6, and a following relation is satisfied:

$$1.00 \leq (d7+d9)/d6 \leq 2.50.$$

3. The camera optical lens as described in claim 1, a total track length of the camera optical lens is TTL, and a following relation is satisfied:

$$8.00 \leq TTL/f \leq 12.00.$$

4. The camera optical lens as described in claim 1, wherein an object-side surface of the first lens is convex at a paraxial position, and an image-side surface of the first lens is concave at the paraxial position;

a focal length of the first lens is f1, a central curvature radius of the object-side surface of the first lens is R1, a central curvature radius of the image-side surface of the first lens is R2, an on-axis thickness of the first lens is d1, a total track length of the camera optical lens is TTL, and following relations are satisfied:

$$-7.82 \leq f1/f \leq -2.30;$$

$$0.81 \leq (R1+R2)/(R1-R2) \leq 2.63;$$

$$0.00 \leq d1/TTL \leq 0.15.$$

5. The camera optical lens as described in claim 1, wherein the object-side surface of the second lens is convex at a paraxial position, and the image-side surface of the second lens is concave at the paraxial position;

a focal length of the second lens is f2, an on-axis thickness of the second lens is d3, a total track length of the camera optical lens is TTL, and following relations are satisfied:

$$-20.66 \leq f2/f \leq -2.89;$$

$$0.02 \leq d3/TTL \leq 0.13.$$

6. The camera optical lens as described in claim 1, wherein an object-side surface of the third lens is concave at a paraxial position, and an image-side surface of the third lens is convex at the paraxial position;

a central curvature radius of the object-side surface of the third lens is R5, a central curvature radius of the image-side surface of the third lens is R6, an on-axis thickness of the third lens is d5, a total track length of the camera optical lens is TTL, and following relations are satisfied:

$$0.83 \leq (R5+R6)/(R5-R6) \leq 2.98;$$

$$0.04 \leq d5/TTL \leq 0.18.$$

7. The camera optical lens as described in claim 1, wherein an object-side surface of the fourth lens is convex at a paraxial position, and an image-side surface of the fourth lens is concave at the paraxial position;

a focal length of the fourth lens is f4, a central curvature radius of the object-side surface of the fourth lens is R7, a central curvature radius of the image-side surface of the fourth lens is R8, an on-axis thickness of the fourth lens is d7, a total track length of the camera optical lens is TTL, and following relations are satisfied:

$$-9.83 \leq f4/f \leq -1.83;$$

$$1.00 \leq (R7+R8)/(R7-R8) \leq 3.74;$$

$$0.02 \leq d7/TTL \leq 0.10.$$

8. The camera optical lens as described in claim 1, wherein an object-side surface of the fifth lens is convex at a paraxial position, and an image-side surface of the fifth lens is convex at the paraxial position;

a focal length of the fifth lens is f5, a central curvature radius of the object-side surface of the fifth lens is R9, a central curvature radius of the image-side surface of the fifth lens is R10, an on-axis thickness of the fifth lens is d9, a total track length of the camera optical lens is TTL, and following relations are satisfied:

$$0.66 \le f5/f \le 3.20;$$

$$-0.40 \le (R9+R10)/(R9-R10) \le -0.02;$$

$$0.06 \le d9/TTL \le 0.22.$$

9. The camera optical lens as described in claim 1, wherein a field of view in a diagonal direction of the camera optical lens is FOV, and a following relation is satisfied:

$$FOV \ge 194°.$$

* * * * *